US011910427B2

(12) United States Patent
Elshafie et al.

(10) Patent No.: US 11,910,427 B2
(45) Date of Patent: Feb. 20, 2024

(54) TRIGGERING CSI RESOURCE SIGNALS AND CSI REPORTS IN 5G NR

(71) Applicant: QUALCOMM INCORPORATED, San Diego, CA (US)

(72) Inventors: Ahmed Elshafie, San Diego, CA (US); Yi Huang, San Diego, CA (US); Hwan Joon Kwon, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 209 days.

(21) Appl. No.: 17/483,464

(22) Filed: Sep. 23, 2021

(65) Prior Publication Data

US 2022/0104207 A1   Mar. 31, 2022

Related U.S. Application Data

(60) Provisional application No. 63/198,161, filed on Sep. 30, 2020.

(51) Int. Cl.
*H04W 72/542* (2023.01)
*H04W 80/02* (2009.01)
*H04L 1/1867* (2023.01)
*H04W 72/23* (2023.01)

(52) U.S. Cl.
CPC ......... *H04W 72/542* (2023.01); *H04L 1/1896* (2013.01); *H04W 72/23* (2023.01); *H04W 80/02* (2013.01)

(58) Field of Classification Search
CPC ... H04W 72/542; H04W 72/23; H04W 80/02; H04L 1/1896; H04L 1/0027; H04L 1/1614; H04L 1/201; H04L 1/1671
See application file for complete search history.

(56) References Cited

U.S. PATENT DOCUMENTS

| | | | |
|---|---|---|---|
| 2021/0337536 A1* | 10/2021 | Li | H04W 72/569 |
| 2022/0095312 A1* | 3/2022 | Yoshioka | H04L 1/1812 |
| 2023/0068109 A1* | 3/2023 | Bagheri | H04L 1/0026 |

(Continued)

OTHER PUBLICATIONS

3GPP TSG RAN WG1 Meeting #102-e; R1-2005244 ; Source: Huawei, HiSilicon; Title: CSI feedback enhancements; E-meeting, Aug. 17-28, 2020 (Year: 2020).*

(Continued)

*Primary Examiner* — Mohammed S Chowdhury
(74) *Attorney, Agent, or Firm* — Haynes and Boone, LLP

(57) ABSTRACT

Wireless communications systems and methods related to dynamically triggering aperiodic CSI reporting are disclosed. A UE may determine whether a condition is satisfied for triggering upon receipt of a signal from a BS. The condition may be based on a decoding status of the signal. In some examples, the UE may explicitly request a CSI resource signal (e.g., CSI-RS, CSI-IM, or both) from the BS when the condition is met. The explicit request may be included in a modified ACK/NACK field, regardless of whether an ACK or NACK is transmitted. The BS may respond with a CSI resource signal. In other examples, the BS may wait to respond with a CSI resource signal until a threshold number of requests are received from the UE. In other examples, the BS may track a number of NACKs from the UE instead of relying upon an explicit request.

22 Claims, 9 Drawing Sheets

(56) References Cited

U.S. PATENT DOCUMENTS

2023/0080106 A1* 3/2023 Ji ........................ H04L 1/0013
2023/0097142 A1* 3/2023 Alfarhan .............. H04L 5/0051
370/329

OTHER PUBLICATIONS

3GPP TSG-RAN WG1 NR Ad Hoc #3; R1-1716353; Source: Ericsson; Title: On dynamic triggering for CSI reports and CSI-RS; Nagoya, Japan, Sep. 18-21, 2017 (Year: 2017).*

2GPP TSG RAN WG1 Ad Hoc Meeting; R1-1800829; Source: Huawei, HiSilicon; Title: Aperiodic CSI feedback on PUCCH in NR; Vancouver, Canada, Jan. 22-26, 2018. (Year: 2018).*

3GPP TSG RAN WG1 #102-e; R1-2005375; Source: vivo; Title: CSI feedback enhancements for Rel-17 URLLC; e-Meeting, Aug. 17-28, 2020. (Year: 2020).*

* cited by examiner

TRIGGERING CSI RESOURCE SIGNALS AND CSI REPORTS IN 5G NR

CROSS-REFERENCE TO RELATED APPLICATIONS

The present application claims priority to and the benefit of U.S. Provisional Application No. 63/198,161, filed Sep. 30, 2020, which is hereby incorporated by reference in its entirety as if fully set forth below and for all applicable purposes.

TECHNICAL FIELD

This application relates generally to wireless communication systems, and more particularly to triggering transmission of channel state information resource signals and channel state information reports.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology, which may be referred to as $5^{th}$ Generation (5G). To ensure good signal quality between a UE and a BS, channel state information (CSI) reports may be occasionally sent from the UE to the BS. Aperiodic CSI reports may be transmitted in response to a request by the BS to trigger the report. Problems arise, however, with triggering CSI reports in this manner Triggering the CSI reports via downlink grant may use too many resources, resulting in inefficiencies.

Further, aperiodic CSI reports may be transmitted on the physical uplink shared channel (PUSCH) using the uplink (UL) grant. This may result in slower aperiodic CSI reporting, however, further resulting in the BS having CSI information that is more out of date than may be desirable for communications such as ultra-reliable low-latency communication (URLLC).

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication according to some embodiments includes receiving, by a first wireless communications device, a signal from a second wireless communications device. The method may further include determining, by the first wireless communications device based on a condition associated with the signal, that a trigger has been satisfied. The method may further include monitoring, by the first wireless communications device after a predetermined time in response to the trigger being satisfied, a channel state information (CSI) resource signal from the second wireless communications device.

In another aspect of the disclosure, a method of wireless communication according to some embodiments includes transmitting, by a first wireless communications device, a signal to a second wireless communications device. The method may further include receiving, by the first wireless communications device from the second wireless communications device, a response message based on the signal. The method may further include determining, by the first wireless communications device, whether a trigger has been satisfied based on the response message. The method may further include transmitting, by the first wireless communications device after a predetermined time in response to the trigger being satisfied, a channel state information (CSI) resource signal to the second wireless communications device.

In another aspect of the disclosure, a first wireless communications device comprises a transceiver configured to receive a signal from a second wireless communications device. The first wireless communications device further comprises a processor configured to determine, based on a condition associated with the signal, that a trigger has been satisfied. The processor is further configured to monitor, after a predetermined time in response to the trigger being satisfied, for a channel state information (CSI) resource signal from the second wireless communications device.

In another aspect of the disclosure, a first wireless communications device comprises a transceiver configured to transmit a signal to a second wireless communications device. The transceiver is further configured to receive, by the first wireless communications device from the second wireless communications device, a response message based on the signal. The first wireless communications device further comprises a processor configured to determine whether a trigger has been satisfied based on the response message. The transceiver is further configured to transmit, after a predetermined time in response to the trigger being satisfied, a channel state information (CSI) resource signal to the second wireless communications device.

In another aspect of the disclosure, a non-transitory computer-readable medium having program code recorded thereon, the program code including: code for causing a first wireless communications device to receive a signal from a second wireless communications device. The program code further comprises code for causing the first wireless communications device to determine, based on a condition associated with the signal, that a trigger has been satisfied. The program code further comprises code for causing the first wireless communications device to monitor, after a predetermined time in response to the trigger being satisfied, for a channel state information (CSI) resource signal from the second wireless communications device.

In another aspect of the disclosure, a non-transitory computer-readable medium having program code recorded thereon, the program code including: code for causing a first wireless communications device to transmit a signal to a second wireless communications device. The program code further comprises code for causing the first wireless communications device to receive, from the second wireless communications device, a response message based on the signal. The program code further comprises code for causing the first wireless communications device to determine whether a trigger has been satisfied based on the response message. The program code further comprises code for causing the first wireless communications device to transmit, after a predetermined time in response to the trigger being satisfied, a channel state information (CSI) resource signal to the second wireless communications device.

In another aspect of the disclosure, a first wireless communications device comprises means for receiving a signal from a second wireless communications device. The first wireless communications device further comprises means for determining, based on a condition associated with the signal, that a trigger has been satisfied. The first wireless communications device further comprises means for monitoring, after a predetermined time in response to the trigger being satisfied, for a channel state information (CSI) resource signal from the second wireless communications device.

In another aspect of the disclosure, a first wireless communications device comprises means for means for transmitting a signal to a second wireless communications device. The first wireless communications device further comprises means for receiving from the second wireless communications device a response message based on the signal. The first wireless communications device further comprises means for determining whether a trigger has been satisfied based on the response message. The first wireless communications device further comprises means for transmitting, after a predetermined time in response to the trigger being satisfied, a channel state information (CSI) resource signal to the second wireless communications device.

Other aspects, features, and embodiments of the present disclosure will become apparent to those of ordinary skill in the art, upon reviewing the following description of specific, example embodiments of the present disclosure in conjunction with the accompanying figures. While features of the present disclosure may be discussed relative to certain embodiments and figures below, all embodiments of the present disclosure can include one or more of the advantageous features discussed herein. In other words, while one or more embodiments may be discussed as having certain advantageous features, one or more of such features may also be used in accordance with the various embodiments of the disclosure discussed herein. In similar fashion, while example embodiments may be discussed below as device, system, or method embodiments it should be understood that such example embodiments can be implemented in various devices, systems, and methods.

DETAILED DESCRIPTION

Figure 1:
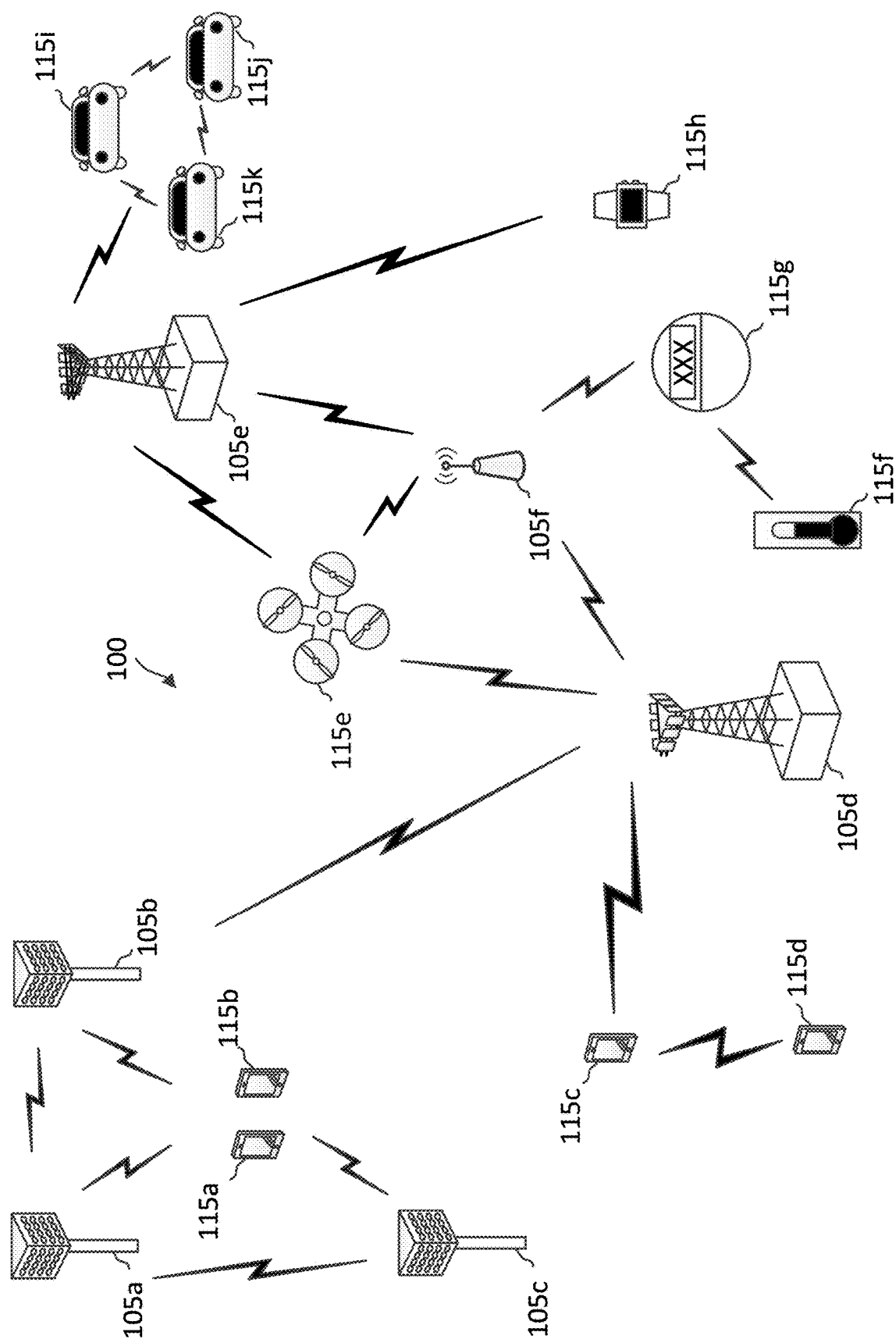
FIG. 1 illustrates a wireless communication network according to some embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km$^2$), extreme data rates (e.g., multi-Gbps rate, 100+Mbps user experienced rates), and deep awareness with advanced discovery and optimizations.

The 5G NR may be implemented to use optimized OFDM-based waveforms with scalable numerology and transmission time intervals (TTIs); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink (UL)/downlink (DL) scheduling information, data, and acknowledgement in the same subframe. The self-contained integrated subframe supports communications in unlicensed or contention-based shared spectrum, adaptive UL/DL that may be flexibly configured on a per-cell basis to dynamically switch between UL and DL to meet the current traffic needs.

Embodiments of the present disclosure relate to aperiodically triggering transmission of channel state information resource signals and channel state information reports. For example, in some embodiments, a BS may aperiodically transmit a CSI reference signal to the UE. This reference signal may be a channel state information reference signal (CSI-RS), a channel state information interference measurement (CSI-IM), or another type of reference signal. The UE may use the reference signal to generate a CSI report indicating the quality of the signal communication between the BS and UE. CSI reports may be sent to BSs periodically or aperiodically. Periodic reports are transmitted at consistent times regardless of the decoding status of the UE or any other characteristics of the communication. Aperiodic reports may be transmitted in response to a request from the network, instead of according to a predetermined schedule. The aperiodic reporting may be configured by a radio resource control (RRC) message or downlink control information (DCI).

Transmitting CSI reports over the physical uplink control channel (PUCCH) may enable faster and more frequent aperiodic CSI reporting. Increased frequency of aperiodic CSI reporting in turn allows the BS to more accurately and more quickly make necessary adjustments to improve signal quality more quickly. To cope with such faster and/or more frequent aperiodic CSI reporting (e.g., enabling more responsive signal quality improvements), the present disclosure describes approaches for triggering aperiodic CSI reporting based on various conditions associated with the communication signal.

In some embodiments, the UE may trigger aperiodic CSI reporting based on an explicit signal sent to the BS. For example, this may be based on first determining a decoding status after receiving data from the BS. Some examples of decoding status used to trigger aperiodic CSI reporting, such as using explicit signaling, may include observed modulation and coding scheme (MCS), log-likelihood ratio (LLR) quality, observed signal to interference plus noise ratio (SINR), block error rate (BLER), bit error rate (BER), number of code blocks or code block groups received with error(s), some other related metric and/or a combination of the above. In some embodiments, the explicit signal sent by the UE may be included in a modified acknowledgement/negative acknowledgement (ACK/NACK) field to the BS. The modified ACK/NACK field may include one subfield for an ACK/NACK symbol and an additional subfield for a request signal. The request signal may serve as a trigger to the BS that the UE requests a CSI reference signal. This may be used regardless of whether the UE was successful in decoding the relevant signal from the BS (i.e., whether the UE is transmitting an ACK or a NACK, the UE may still include the CSI request signal in the appropriate sub-field). In some embodiments, the request signal may be populated with a value indicating a request for a CSI reference signal regardless of whether the UE is transmitting an ACK or a NACK in the ACK/NACK field.

When the BS receives the modified ACK/NACK field with a request signal indicating that a CSI resource signal is requested by the UE, the BS may generate and transmit a CSI resource signal to the UE. The BS may transmit the CSI resource signal a fixed amount of time after receiving the explicit signal. In some examples, the CSI resource signal may be a CSI-reference signal (CSI-RS), while in other examples the CSI resource signal may be a CSI-interference measurement (CSI-IM) signal, also referred to herein as a zero-power CSI-RS. In the latter case, the CSI resource signal may therefore be the absence of a signal over a specified number of resource elements. Based on the received CSI resource signal, the UE may then generate a CSI report and transmit the report to the BS. Where the CSI report is based on CSI-RS, the CSI report may include one or more of a channel quality indicator (CQI), a rank indicator (RI), a precoding matrix indicator (PMI), a strongest layer indicator (SLI), and/or a layer 1 reference signal received power (RSRP). In embodiments in which the CSI report is based on CSI-IM, the CSI report may also include one or more of an interference average power indicator, interference covariance matrix eigenvalues, and/or an interference matrix rank. Moreover, the CSI report may be a report for a sub-band or a wide band. For example, the UE may transmit the CSI report a fixed amount of time after receiving the CSI resource signal from the BS. In some embodiments, the CSI report may be transmitted on the Physical Uplink Control Channel (PUCCH) or Physical Uplink Shared Channel (PUSCH).

In other embodiments, instead of transmitting a CSI resource signal after receiving a request signal (e.g., a 1-to-1 correspondence between request signal and CSI resource signal transmission), the BS may count a number of times that the UE sends a request signal (e.g., via the modified ACK/NACK field). Again, this may be used regardless of whether the UE was successful in decoding the relevant signal from the BS. Once the BS has received a threshold number of request signals, the BS may trigger sending the CSI resource signal (whether CSI-RS or CSI-IM, for example). When a UE sends a request signal as a subfield of a modified ACK/NACK field, the BS and/or the UE may count the total number of request signals sent by the UE to the BS in a predetermined time allotment. If the number of request signals sent by the UE in the allotted time exceeds the threshold, the BS may send the CSI resource signal after a fixed amount of time to start the aperiodic CSI reporting process. From this, the UE may transmit a CSI report a fixed amount of time after receiving the CSI resource signal. If, however, the number of request signals sent in the allotted time does not exceed the threshold, the BS may wait to send the CSI reference signal until the threshold is met in the current time allotment, or start counting again at the start of a new time allotment.

In still other embodiments, the UE and BS may rely upon monitoring other aspects of exchanges between the UE and BS instead of using an explicit signal (e.g., the additional sub-field for the request signal in a modified ACK/NACK field). Accordingly, the BS may be configured to track a number of NACKs received from the UE over a specified time period. The BS may be configured to transmit a CSI reference signal in response to the number of NACKs from the UE exceeding a threshold amount during the time period. If the number of NACKs received by the BS in the time period exceeds the threshold amount, it may trigger the BS to send the CSI resource signal to the UE starting the CSI reporting process. The UE may similarly track the number of NACKs it sends within the time period.

The BS may transmit the CSI resource signal after a fixed amount of time to start the aperiodic CSI reporting process. From this, the UE may transmit a CSI report a fixed amount of time after receiving the CSI resource signal. In this way, the ACK/NACK signal may remain unmodified. Rather, the BS and/or the UE may both determine that a CSI reference signal is needed and/or requested based on the number of NACKs transmitted and received exceeding a threshold. Moreover, in some examples aspects of the present disclosure may work with semi-persistent scheduling as well, such as by tracking the number of NACKs compared to a threshold over a period of time. The SPS may be activated via downlink control information (DCI) in some examples. The configuration could be per SPS configuration or based on the conditions occurring across SPS configurations.

A number of benefits are derived from aspects of the disclosure described herein. For example, approaches for triggering aperiodic CSI reporting based on various conditions according to embodiments of the present disclosure, faster and/or more frequent aperiodic CSI reporting may occur. This, in turn, may provide the BS with more up-to-date CSI information that may improve physical downlink shared channel (PDSCH) performance. Moreover, faster and/or more frequent aperiodic CSI reporting may improve PDSCH performance because parameters relating to the transmissions between the BS and UE may be enhanced more rapidly and poor communication may be solved more quickly. Embodiments of the present disclosure may also improve reliability and reduce latency. Embodiments of the present disclosure described may also improve the efficiency of UE and/or BS processes. The present disclosure may also allow for increased flexibility throughout a 5G NR network by providing more triggering options for CSI reporting. Parameters related to CSI report triggering, scheduling, and transmission may more easily be adapted to fit various scenarios, environments, and applications.

Various aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may include at least one element of a claim.

FIG. 1 illustrates a wireless communication network 100 according to some embodiments of the present disclosure. The network 100 may be a 5G network. The network 100 includes a number of base stations (BSs) 105 and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105*f* may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115*a*-115*d* are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115*e*-115*k* are examples of various machines configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the DL and/or UL, or desired transmission between BSs, and backhaul transmissions between BSs.

In operation, the BSs 105*a*-105*c* may serve the UEs 115*a* and 115*b* using 3D beamforming and coordinated spatial techniques, such as coordinated multipoint (CoMP) or multi-connectivity. The macro BS 105*d* may perform backhaul communications with the BSs 105*a*-105*c*, as well as with the small cell, the BS 105*f*. The macro BS 105*d* may also transmit multicast services which are subscribed to and received by the UEs 115*c* and 115*d*. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115*e*, which may be a drone. Redundant communication links with the UE 115*e* may include links from the macro BSs 105*d* and 105*e*, as well as links from the small cell BS 105*f*. Other machine type devices, such as the UE 115*f* (e.g., a thermometer), the UE 115*g* (e.g., smart meter), and UE 115*h* (e.g., wearable device) may communicate through the network 100 either directly with BSs, such as the small cell BS 105*f*, and the macro BS 105*e*, or in multi-hop configurations by communicating with another user device which relays its information to the network, such as the UE 115*f* communicating temperature measurement information to the smart meter, the UE 115*g*, which is then reported to the network through the small cell BS 105*f*. The network 100 may also provide additional network efficiency through dynamic, low-latency TDD/FDD communications, such as in a vehicle-to-vehicle (V2V), V2X, C-V2X communications between a UE 115*i*, 115*j*, or 115*k* and other UEs 115, and/or vehicle-to-infrastructure (V2I) communications between a UE 115*i*, 115*j*, or 115*k* and a BS 105 (e.g., PC5 etc.).

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some aspects, the BSs 105 can assign or schedule transmission resources (e.g., in the form of time-frequency resource elements (RE)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel, and/or CSI-IM (e.g., NZP CSI-RS, a set of resource elements reserved for interference measurement). Similarly, a UE 115 may transmit sounding reference signals (SRSs) to enable a BS 105 to estimate a UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for DL communication.

In some aspects, the network 100 may be an NR network deployed over a licensed spectrum. The BSs 105 can transmit synchronization signals (e.g., a PSS and a SSS) in the network 100 to facilitate synchronization. The BSs 105 can broadcast system information associated with the network 100 (e.g., including a master information block (MIB), remaining minimum system information (e.g., RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (e.g., PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant (and/or part of a configured grant procedure). The UE 115 may transmit a UL communication signal to the BS 105 via a PUSCH and/or PUCCH according to a UL scheduling grant.

In some aspects, the BS 105 may communicate with a UE 115 using HARQ techniques to improve communication reliability, for example, to provide a URLLC service. The BS 105 may schedule a UE 115 for a PDSCH communication by transmitting a DL grant in a PDCCH. The BS 105 may transmit a DL data packet to the UE 115 according to the schedule in the PDSCH. The DL data packet may be transmitted in the form of a transport block (TB). If the UE 115 receives the DL data packet successfully, the UE 115 may transmit a HARQ ACK to the BS 105. Conversely, if the UE 115 fails to receive the DL transmission successfully, the UE 115 may transmit a HARQ NACK to the BS 105. Upon receiving a HARQ NACK from the UE 115, the BS 105 may retransmit the DL data packet to the UE 115. The retransmission may include the same coded version of DL data as the initial transmission. Alternatively, the retransmission may include a different coded version of the DL data than the initial transmission. The UE 115 may apply soft-combining to combine the encoded data received from the initial transmission and the retransmission for decoding. The BS 105 and the UE 115 may also apply HARQ for UL communications using substantially similar mechanisms as the DL HARQ.

In some aspects, the network 100 may operate over a system BW or a component carrier BW. The network 100 may partition the system BW into multiple BWPs (e.g., portions). A BS 105 may dynamically assign a UE 115 to operate over a certain BWP (e.g., a certain portion of the system BW). For example, the BS 105 may make the assignment via RRC and/or other signaling. The assigned BWP may be referred to as the active BWP. The UE 115 may monitor the active BWP for signaling information from the BS 105, such as downlink control information and/or RRC signaling, among other information. The BS 105 may schedule the UE 115 for UL or DL communications in the active BWP. In some aspects, a BS 105 may assign a pair of BWPs within the component carrier to a UE 115 for UL and DL communications. For example, the BWP pair may include one BWP for UL communications and one BWP for DL communications.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

In carrier aggregation (CA) scenarios, each component carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over a set of carrier bandwidths (i.e., carrier aggregation). In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

The number of aggregated component carriers for an uplink transmission may be equal to or less than the number of aggregated component carriers for a downlink transmission to a UE 115. Moreover, the individual component carriers on the downlink and/or the uplink may have different bandwidths from each other—e.g., on the uplink, individual component carriers that are aggregated together for an uplink transmission from the UE 115 may have different bandwidths from each other. Further, carrier aggregation may be used with both frequency division duplexing (FDD) and time division duplexing (TDD) component carriers. In some aggregation scenarios, the component carriers may be contiguous to each other within a frequency band (e.g., intra-band contiguous). In other scenarios, the component carriers may include one or more component carriers that are not contiguous to each other within a frequency band (e.g., intra-band non-contiguous). In yet other scenarios, the component carriers may include one or more component carriers that are not in the same frequency band to each other (e.g., inter-band non-contiguous).

In some aspects, the network 100 may operate over a shared channel, which may include shared frequency bands and/or unlicensed frequency bands. For example, the network 100 may be an NR-U network operating over an unlicensed frequency band. In such an aspect, the BSs 105 and the UEs 115 may be operated by multiple network operating entities. To avoid collisions, the BSs 105 and the UEs 115 may employ a listen-before-talk (LBT) procedure to monitor for transmission opportunities (TXOPs) in the shared channel A TXOP may also be referred to as COT (e.g., a channel occupancy time). For example, a transmitting node (e.g., a BS 105 or a UE 115) may perform an LBT prior to transmitting in the channel. When the LBT passes, the transmitting node may proceed with the transmission. When the LBT fails, the transmitting node may refrain from transmitting in the channel.

An LBT can be based on energy detection (ED) or signal detection. For an energy detection-based LBT, the LBT results in a pass when signal energy measured from the channel is below a threshold. Conversely, the LBT results in a failure when signal energy measured from the channel exceeds the threshold. An LBT may include one, two, or more clear channel assessments (CCAs) performed during successive time periods. For a signal detection-based LBT, the LBT results in a pass when a channel reservation signal (e.g., a predetermined preamble signal) is not detected in the channel Additionally, an LBT may be in a variety of modes. An LBT mode may be, for example, a category 4 (CAT4) LBT, a category 2 (CAT2) LBT, or a category 1 (CAT1) LBT. A CAT1 LBT is referred to as a no LBT mode, where no LBT is to be performed prior to a transmission. A CAT2 LBT refers to an LBT without a random back-off period. For instance, a transmitting node may determine a channel measurement in a time interval and determine whether the channel is available or not based on a comparison of the channel measurement against a ED threshold. A CAT4 LBT refers to an LBT with a random back-off and a variable contention window (CW). For instance, a transmitting node may draw a random number and back-off for a duration based on the drawn random number in a certain time unit.

In some embodiments, a BS 105 may transmit to one or more UEs 115 a CSI-RS, channel state information interference measurement (CSI-IM), or similar signal relating to channel state information. UEs 115 may receive channel state information signals including CSI-RS, CSI-IM, or other signals, and may measure channel state information (CSI) based on the received signals. CSI may include any suitable metrics, measurements, or indicators relating to the quality of communication between a BS 105 and a UE 115 at any given time. In some embodiments, CSI based on CSI-RS may include such metrics as a channel quality indicator (CQI), preceding matrix index (PMI), rank indicator (RI), or any other metric, measurement, or indicator. In other embodiments, CSI based on CSI-IM may include such metrics as one or more of an interference average power indicator, interference covariance matrix eigenvalues, an interference matrix rank, or any other suitable indicator or value.

A BS 105 may schedule the transmission of CSI-RSs or CSI-IMs. In some embodiments, the BS 105 may schedule transmissions of CSI-RSs or CSI-IMs periodically or aperiodically. When a BS 105 schedules transmissions of CSI-RSs or CSI-IMs aperiodically, CSI-RS or CSI-IM transmissions may be scheduled in response to conditions or events during the communication process between a BS 105 and UE 115, in response to decoding statuses of the UE 115, values of various ACK/NACK fields or modified ACK/NACK fields, and/or in response to other conditions or events. For example, the UE 115 may trigger aperiodic CSI reporting based on an explicit signal sent to the BS 105. This may be based on determining a decoding status after receiving data from the BS 105, such as MCS, LLR quality, SINR, BLER, BER, CB or CBGs, and/or some other metric or combination of the above. The UE 115 may include the explicit signal in a modified ACK/NACK field (e.g., with a sub-field added to the regular ACK/NACK field for the explicit signal). The request signal may be a single bit, for example, that may be asserted high or low to serve as a trigger to the BS 105 that the UE 115 requests a CSI reference signal. This may be used whether the UE 115 is transmitting an ACK or a NACK. The BS 105 may send a CSI-RS or CSI-IM (depending on type of CSI resource signal requested or pre-configured) in response to the request signal.

Alternatively, instead of transmitting a CSI resource signal after receiving a request signal (e.g., a 1-to-1 correspondence between request signal and CSI transmission), the BS 105 may count a number of times that the UE 115 sends a request signal (e.g., again regardless of whether the UE 115 is transmitting ACK or NACK). Once the BS 105 has received a threshold number of request signals within a predetermined time allotment, the BS 105 may trigger sending the CSI-RS or CSI-IM. Both the BS 105 and the UE 115 may track the count (and both be aware of the threshold) so that the UE 115 may know when to expect the CSI-RS or CSI-IM within a given amount of time.

In still other embodiments, the UE 115 and BS 105 may rely upon monitoring other aspects of exchanges between them instead of using an explicit signal. For example, the BS 105 may be configured to track a number of NACKs received from the UE 115 over a specified time period. The BS 105 may be triggered to transmit a CSI-RS or CSI-IM in response to the number of NACKs exceeding a threshold amount during a time period. Again, the UE 115 may similarly track the number of NACKs it sends within the time period so that the UE 115 may know when to expect the CSI-RS or CSI-IM within a given amount of time.

The BS 105 may transmit the CSI-RS or CSI-IM after a fixed amount of time to start the aperiodic CSI reporting process. From this, the UE may transmit a CSI report a fixed amount of time after receiving the CSI resource signal. In this way, the ACK/NACK signal may remain unmodified. Rather, the BS and/or the UE may both determine that a CSI reference signal is needed and/or requested based on the number of NACKs transmitted and received exceeding a threshold. Upon receipt of a CSI-RS or CSI-IM transmission, the UE 115 may generate a CSI report. The CSI report may be transmitted to the BS 105 for the BS 105 to use to, e.g., alter or adjust various parameters relating to the communication between the devices. Moreover, in some examples aspects of the present disclosure may work with semi-persistent scheduling as well, such as by tracking the number of NACKs compared to a threshold over a period of time. The SPS may be activated and/or deactivated via downlink control information (DCI) in some examples. The configuration could be per SPS configuration or based on the conditions occurring across SPS configurations.

Figure 2:
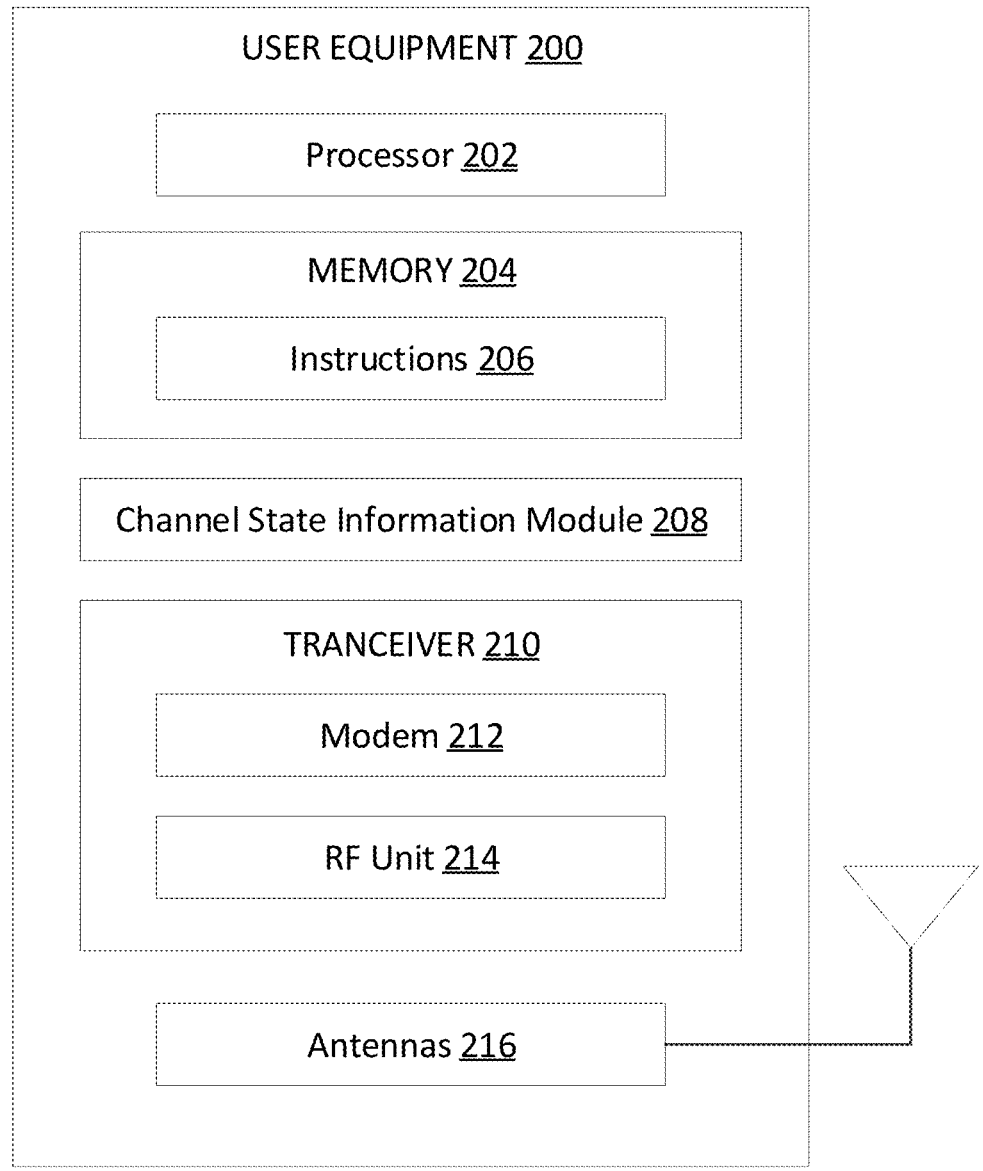
FIG. 2 illustrates a block diagram of an example user equipment (UE) according to aspects of the present disclosure.

FIG. 2 is a block diagram of an exemplary UE 200 according to embodiments of the present disclosure. The UE 200 may be a UE 115 as discussed above. As shown, the UE 200 may include a processor 202, a memory 204, a channel state information module 208, a transceiver 210 including a modem subsystem 212 and a radio frequency (RF) unit 214, and one or more antennas 216. These elements may be in direct or indirect communication with each other, for example via one or more buses.

The processor 202 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 202 may also be implemented as a combination of computing devices, e.g., a combination of a DSP and a microprocessor, a plurality of microprocessors, one or more microprocessors in conjunction with a DSP core, or any other such configuration.

The memory 204 may include a cache memory (e.g., a cache memory of the processor 202), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 204 includes a non-transitory computer-readable medium. The memory 204 may store instructions 206. The instructions 206 may include instructions that, when executed by the processor 202, cause the processor 202 to perform the operations described herein with reference to the UEs 115 in connection with embodiments of the present disclosure. The instructions 206 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The channel state information (CSI) module 208 may be implemented via hardware, software, or combinations thereof. For example, the channel state information module 208 may be implemented as a processor, circuit, and/or instructions 206 stored in the memory 204 and executed by the processor 202.

The channel state information (CSI) module 208 may be configured to evaluate data received through a downlink transmission and transmit signals relating to channel state information to a BS (e.g., BS 105). The CSI module 208 may additionally cause the UE 200 to transmit request signals or other signals relating to channel state information to the BS 105. The CSI module 208 may also cooperate with the rest of the UE 200 to receive CSI resource signals (e.g., CSI-RS and/or CSI-IM) from which it may generate CSI reports for transmission back to the BS 105. For example, in some embodiments, the CSI module 208 may determine a decoding status (such as MCS, LLR quality, observed SINR, CB/CBGs, BLER, BER, etc.) after receiving physical downlink transmission data from a BS (e.g., a BS 105).

In some embodiments, the CSI module 208 may rely upon an explicit request signal to trigger the BS 105 to transmit a CSI resource signal such as CSI-RS or CSI-IM. For example, the CSI module 208 may cause the UE 200 to transmit the request signal as part of a modified ACK/NACK field to the BS 105. The modified ACK/NACK field may include one subfield for an ACK or NACK bit (or bits) and an additional subfield for a request signal (e.g., one or more bits). The request signal may indicate to the BS 105 that the UE 200 requests a CSI reference signal to create a CSI report. In some embodiments, the request signal may be populated with a value indicating a request for a CSI reference signal based on an ACK/NACK field. In other embodiments, the UE 200 may send a request signal in response a decoding status as will be discussed in more detail hereafter. In some embodiments, the module 208 may be configured such that the UE 200 may send a request signal based on both an ACK/NACK field and a decoding status. As an example, the CSI module 208 may include a request signal regardless of whether the ACK/NACK field has a NACK or an ACK. E.g., in a scenario where the first subfield comprises a bit for the ACK/NACK field, and a second subfield comprises a bit for the request signal, an exemplary table may include as an example:

TABLE 1

ACK/NACK and CSI request signal fields

| ACK/NACK field | Request signal field | Meaning |
|---|---|---|
| 0 | 0 | NACK, and CSI-RS/CSI-IM not requested |
| 0 | 1 | NACK, and CSI-RS/CSI-IM requested |

TABLE 1-continued

ACK/NACK and CSI request signal fields

| ACK/NACK field | Request signal field | Meaning |
|---|---|---|
| 1 | 0 | ACK, and CSI-RS/CSI-IM not requested |
| 1 | 1 | NACK, and CSI-RS/CSI-IM requested |

From Table 1, it can be seen that situations may arise where the UE 200, via the CSI module 208, may request an aperiodic CSI from the BS 105 even where the UE 200 is able to send an ACK for the received message. This may correspond to situations where the UE 200 was able to recover the downlink communication, but one or more conditions associated with the message (e.g., MCS, LLR quality, observed SINR, BLER, BER, etc.) may have fallen below a threshold that the CSI module 208 compared the one or more conditions against.

In some embodiments, when the BS 105 receives the modified ACK/NACK field from the UE 200 with a request signal indicating that a CSI reference signal is requested, the BS 105 may generate and transmit a CSI resource signal to the UE 200 (e.g., CSI-RS or CSI-IM). The CSI module 208 may then cooperate with the rest of the UE 200 to generate a CSI report and cause the CSI report to be transmitted to the BS 105. The BS 105 may then adjust parameters relating to the communication accordingly. The BS 105 may also delay sending the CSI resource signal by some predetermined time after receiving the request signal from the UE 200 (which the UE 200 is also aware of, such as via preconfiguration within the UE 200 and/or other control signaling such as RRC or MAC-CE signaling). Similarly, the CSI module 208 of the UE 200 may cause the UE 200 to delay sending the CSI report by some predetermined time.

In other embodiments, instead of a 1:1 correspondence between the UE 200 requesting a CSI resource signal and the BS 105 transmitting it, a threshold number of request signals may be established before the BS 105 may respond with a CSI resource signal. When the CSI module 208 causes the UE 200 to send a request signal as a subfield of a modified ACK/NACK field, the CSI module 208 may count the total number of request signals sent by the UE 200 to the BS 105 in a predetermined time allotment (e.g., before sending the request signal, or while sending the request signal, or just after sending). If the number of request signals sent in the allotted time exceeds a predetermined threshold, the BS 105 may send the CSI resource signal. If, however, the number of request signals sent in the allotted time does not exceed the predetermined threshold, the BS 105 might not send the CSI resource signal.

In still other embodiments, the BS 105 may rely upon monitoring other aspects of exchanges between the UE 200 and the BS 105, such that the UE 200 does not expressly send a request signal by the CSI module 208. Rather, the BS 105 may be configured to monitor/count the number of NACKs transmitted by the UE 200 within a given time frame. Once the number of NACKs exceeds (e.g., meets or exceeds in some examples, or just exceeds in other examples) a threshold, the BS 105 might transmit a CSI resource signal. For example, a threshold number of NACKs and a time allotment may be determined beforehand between the UE 200 and the BS 105. The CSI module 208 may track the number at the UE 200, in some examples, e.g. by counting how many NACKs have been transmitted to the BS 105 in the predetermined time allotted. In this way, the ACK/NACK field may remain unmodified while still facilitating triggering of aperiodic CSI according to embodiments of the present disclosure.

As shown, the transceiver 210 may include the modem subsystem 212 and the RF unit 214. The transceiver 210 can be configured to communicate bi-directionally with other devices, such as the BSs 105 and/or another core network element. The modem subsystem 212 may be configured to modulate and/or encode the data from the memory 204 and/or the channel state information module 208 according to a modulation and coding scheme (MCS), e.g., a low-density parity check (LDPC) coding scheme, a turbo coding scheme, a convolutional coding scheme, a digital beamforming scheme, etc., and in accordance with the predetermined frame structure. The RF unit 214 may be configured to process (e.g., perform analog to digital conversion or digital to analog conversion, etc.) modulated/encoded data from the modem subsystem 212 (on outbound transmissions) or of transmissions originating from another source such as a UE 115 or a BS 105. The RF unit 214 may be further configured to perform analog beamforming in conjunction with the digital beamforming. Although shown as integrated together in transceiver 210, the modem subsystem 212 and the RF unit 214 may be separate devices that are coupled together at the UE 200 to enable the UE 200 to communicate with other devices.

The RF unit 214 may provide the modulated and/or processed data, e.g. data packets (or, more generally, data messages that may contain one or more data packets and other information), to the antennas 216 for transmission to one or more other devices. The antennas 216 may further receive data messages transmitted from other devices. The antennas 216 may provide the received data messages for processing and/or demodulation at the transceiver 210. The antennas 216 may include multiple antennas of similar or different designs in order to sustain multiple transmission links. The RF unit 214 may configure the antennas 216. The transceiver 210, or some component thereof such as the RF unit 214, may include the RF chains as described in embodiments of the present disclosure.

Figure 3:
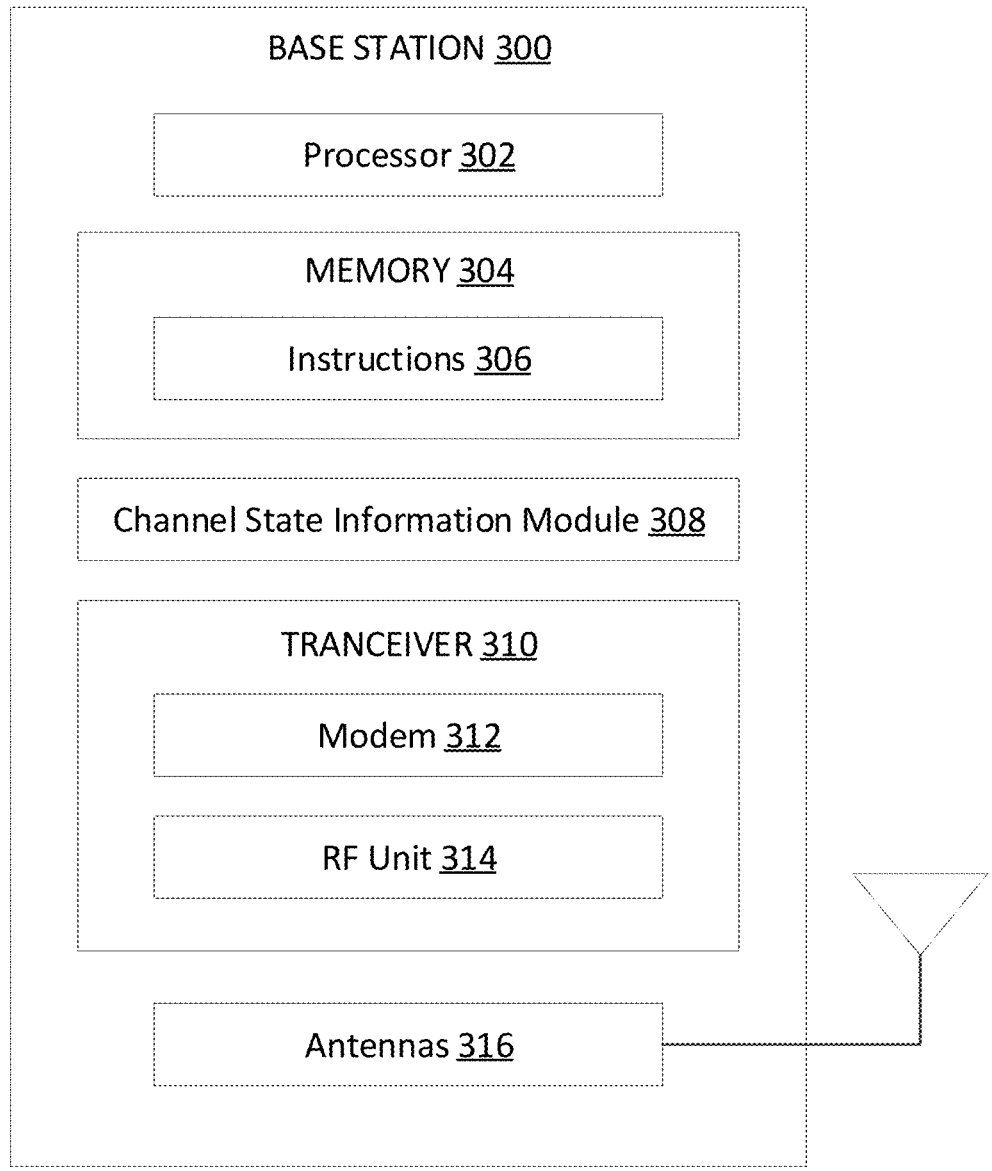
FIG. 3 illustrates a block diagram of an example base station (BS) according to aspects of the present disclosure.

FIG. 3 is a block diagram of an example BS 300 according to embodiments of the present disclosure. The BS 300 may be a BS 105 as discussed above. As shown, the BS 300 may include a processor 302, a memory 304, a CSI module 308, a transceiver 310 including a modem subsystem 312 and a RF unit 314, and one or more antennas 316. These elements may be in direct or indirect communication with each other, for example via one or more buses.

The processor 302 may have various features as a specific-type processor. For example, these may include a CPU, a DSP, an ASIC, a controller, a FPGA device, another hardware device, a firmware device, or any combination thereof configured to perform the operations described herein. The processor 302 may also be implemented as a combination of computing devices, e.g., a combination of a DSP and a microprocessor, a plurality of microprocessors, one or more microprocessors in conjunction with a DSP core, or any other such configuration.

The memory 304 may include a cache memory (e.g., a cache memory of the processor 302), RAM, MRAM, ROM, PROM, EPROM, EEPROM, flash memory, a solid-state memory device, one or more hard disk drives, memristor-based arrays, other forms of volatile and non-volatile memory, or a combination of different types of memory. In some embodiments, the memory 304 may include a non-transitory computer-readable medium. The memory 304 may store instructions 306. The instructions 306 may include instructions that, when executed by the processor 302, cause the processor 302 to perform operations described herein. The instructions 306 may also be referred to as code, which may be interpreted broadly to include any type of computer-readable statement(s) as discussed above with respect to FIG. 2.

The CSI module 308 may be implemented via hardware, software, or combinations thereof. For example, the CSI module 308 may be implemented as a processor, circuit, and/or instructions 306 stored in the memory 304 and executed by the processor 302.

The CSI module 308 may be configured to assist the BS 300 in processing received signals relating to CSI from a triggering UE 200. For example, the CSI module 308 may receive request signals or other signals relating to CSI from a UE 200, indicating that the UE 200 has determined a condition has been met that warrants requesting an aperiodic CSI resource signal from the BS 300. The module 308 may further cause the BS 300 to transmit CSI resource signals from which a triggering UE 200 may generate CSI reports for transmission.

In some embodiments, the CSI module 308 may receive a modified ACK/NACK field from a UE 200. As discussed above with respect to FIG. 2, the modified ACK/NACK field may include one subfield for an ACK or NACK bit(s) and an additional subfield for a request signal bit(s). In response to receiving the modified ACK/NACK field with request signal asserted, the CSI module 308 may cause the BS 300 to generate and transmit a CSI resource signal (e.g., CSI-RS and/or CSI-IM) to the UE 200. The CSI module 308 may then assist the BS 300 in receiving and processing a CSI report generated by the UE 200 and transmitted to the BS 300. The CSI module 308 may assist in processing the received CSI report and/or assist in determining how to alter various parameters associated with the communication between the BS 300 and the UE 200 to enhance signal quality. The CSI module 308 may also cause the BS 300 to delay sending the CSI reference signal by some predetermined time after receiving the request signal from the UE 200. Similarly, the CSI module 308 may delay monitoring for the CSI report by some predetermined time so that the BS 300 and the UE 200 may be synchronized.

In other embodiments, the CSI module 308 may wait until a predetermined number of request signals are received from a UE 200 before proceeding with transmitting the CSI resource signal. When a UE 200 sends a request signal (e.g., as a subfield of a modified ACK/NACK field), the CSI module 308 may count the total number of request signals received in a predetermined time allotment. If the number of request signals in the allotted time exceeds (e.g., meets or exceeds, or exceeds) the predetermined threshold, the CSI module 308 may cause the BS 300 to send the CSI resource signal. If, however, the number of request signals sent in the allotted time does not exceed the predetermined threshold, the module 308 might not send the CSI resource signal.

In still other embodiments, the CSI module 308 may be configured to track a number of NACKs received from a UE 200 instead of receiving a request signal to begin with. The CSI module 308 may compare the number of NACKs received against a threshold number of NACKs received from the UE 200 within a time allotment. If the number of NACKs received at the BS 105 in the allotted time exceeds (e.g., meets or exceeds, or exceeds) the predetermined threshold, the CSI module 308 may cause the BS 300 to send the CSI resource signal to the UE 200. If, however, the number of NACKs received in the allotted time does not exceed the predetermined threshold, the CSI module 308 might not cause the BS 300 to send the CSI resource signal.

As shown, the transceiver 310 may include the modem subsystem 312 and the RF unit 314. The transceiver 310 can be configured to communicate bi-directionally with other devices, such as the UEs 115 and/or another core network element. The modem subsystem 312 may be configured to modulate and/or encode data according to a MCS, e.g., a LDPC coding scheme, a turbo coding scheme, a convolutional coding scheme, a digital beamforming scheme, etc. The RF unit 314 may be configured to process (e.g., perform analog to digital conversion or digital to analog conversion, etc.) modulated/encoded data from the modem subsystem 312 (on outbound transmissions) or of transmissions originating from another source such as a UE 115 or another BS 105. The RF unit 314 may be further configured to perform analog beamforming in conjunction with the digital beamforming. Although shown as integrated together in transceiver 310, the modem subsystem 312 and/or the RF unit 314 may be separate devices that are coupled together at the BS 300 to enable the BS 300 to communicate with other devices.

The RF unit 314 may provide the modulated and/or processed data, e.g. data packets (or, more generally, data messages that may contain one or more data packets and other information), to the antennas 316 for transmission to one or more other devices. This may include, for example, transmission of downlink data transmission, CSI resource signals such as CSI-RS or CSI-IM signals, or any other suitable data or information according to embodiments of the present disclosure. The antennas 316 may further receive data messages transmitted from other devices and provide the received data messages for processing and/or demodulation at the transceiver 310. The antennas 316 may include multiple antennas of similar or different designs in order to sustain multiple transmission links.

Figure 4:
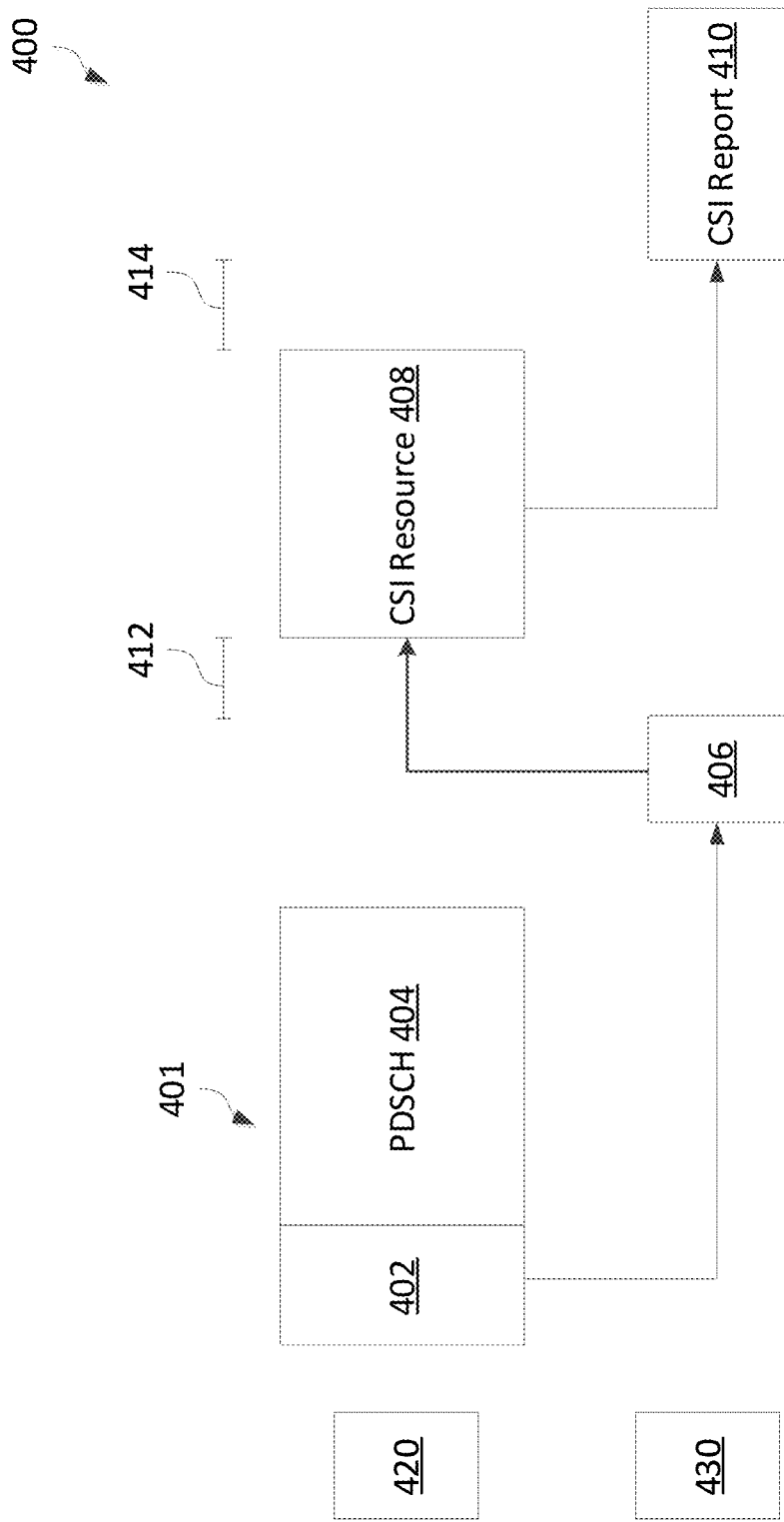
FIG. 4 illustrates a block diagram of channel state information triggering, signaling, and reporting over time according to aspects of the present disclosure.

FIG. 4 is a block diagram 400 of CSI triggering, signaling, and reporting over time according to aspects of the present disclosure. FIG. 4 depicts an exemplary BS 420, an exemplary UE 430, a downlink transmission 401 including a PDCCH signal 402 and a PDSCH signal 404, a physical uplink signal 406, a CSI resource 408, and a CSI report 410. FIG. 4 additionally depicts a time period 412 and a time period 414. The BS 420 may be substantially similar to the BS 105 and/or the BS 300 previously described and may include any features or characteristics previously described with reference to the BS 105 and/or the BS 300. Similarly, the UE 430 may be substantially similar to the UE 115 and/or the UE 200 previously described and may include any features or characteristics previously described with reference to the UE 115 and/or the UE 200.

The downlink transmission 401 shown in FIG. 4 may correspond to a signal transmitted from the BS 420 to the UE 430. The PDCCH signal 402 of the downlink transmission 401 may correspond to one or more control resource sets (CORESETs). The PDCCH signal 402 may be transmitted within one or more CORESETs. In some embodiments, the PDCCH signal 402 may span multiple CORESETs. For example, one or more parameters of the PDCCH signal may specify a period to the UE 430 of frequency and time blocks where PDCCH data is to be found for the specific UE 430.

The PDCCH signal 402 may carry downlink control information (DCI). DCI may carry control information used to schedule events or transmissions, enable or disable features or communication channels, or perform other necessary control actions. For example, DCI may carry transport format, resource allocation, hybrid automatic repeat request (H-ARQ) information relating to DL-SCH, UL-SCH, PCH, or other channels. DCI may additionally correspond to CRC attachment, channel coding, rate matching, PDCCH multiplexing and/or scrambling, modulation, layer mapping and/or precoding, resource element mapping, or other functions. The PDCCH signal 402 may additionally carry DCI 0 used for UL grant scheduling or assignment. The UE 430 may be configured to monitor the PDCCH for signals like the PDCCH signal 402 shown.

The PDSCH signal 404 of the downlink transmission 401 may carry user data, different types of system information blocks (SIB), or other data or information. In some embodiments, the PDSCH signal 404 may correspond to any suitable channels, processes, or functions including but not limited to CRC, code block (CB) segmentation and/or CB-CRC, LDPC, rate matching, CB concatenation, DL-SCH, scrambling, modulation, layer mapping, DM-RS, multi-antenna precoding, CSI-RS, resource mapping, or other functions. The PDSCH signal 404 may be configured by DCI, radio resource control (RRC), or other control information or parameters, such as according to PDCCH 402 and/or other signals.

As shown by the arrow from the PDCCH signal 402 to the physical uplink signal 406, upon receipt of the data of the downlink transmission 401, the UE 430 may perform various processing functions. For example, the UE 430 may evaluate whether the data was properly received. For example, the UE 430 may generate one or more ACKs or NACKs to fill an ACK/NACK field for transmission to the BS 420. In some embodiments, the multiple ACK/NACK fields may be populated and transmitted to the BS 420. The number of ACK/NACK fields may depend on the parameters or characteristics of the received data from either the PDCCH signal 402 and/or the PDSCH signal 404. For example, the UE 430 may determine the number of bits within an ACK/NACK field or the number of ACK/NACK fields more generally based on the number of configured serving cells, the downlink transmission modes, or other features. If an aspect of the received data was properly received by the UE 430, the UE 430 may generate an ACK bit corresponding to that aspect to transmit to the BS 420 (e.g., per resource element, resource block, code block, code block group, component carrier, etc.). If, on the other hand, an aspect of the data was not received or was received in a corrupted format, the UE 430 may generate a NACK bit to transmit to the BS 420.

In some embodiments, the ACK/NACK field may be a modified ACK/NACK field that includes additional bits corresponding to additional specific requests or commands. For example, the physical uplink signal 406 may include a request for a CSI reference signal. This request may be generated based on one or more conditions measured or otherwise observed by the UE 430, such as from the downlink transmission 401. An observed condition of the downlink transmission 401 at the UE 430 may include an observed modulation and coding scheme (MCS). For example, the UE 430 may map a measured SINR to a channel quality indicator (CQI) or MCS. The UE 430 may compare the observed MCS to the MCS value used for the current or previous transmissions. If the observed MCS is lower or higher than the current or previous transmission MCS value, the UE 430 may generate a request signal for transmission to the BS 420. The threshold value for the difference between observed MCS and current or previous MCS value transmissions may be configured by a user of the system, the BS 420 (e.g., via radio resource control (RRC) and/or medium access control control element (MAC-CE) signaling), the UE 430, or any other suitable user or component. The UE 430 may also be configured to store multiple previous MCS values for comparison to observed MCS values and may compare the observed MCS value to any suitable stored MCS value. In some embodiments, the observed MCS value may be compared to multiple MCS values, an average or other statistical value of the stored MCS value, MCS values from other devices, or any other suitable values.

An observed condition of the UE 430 may also include a number of NACKed CBs or CBGs (referring to CBs for simplicity below) over a threshold. For example, the UE 430 may track the number of NACKed CBs over a period of time or in correspondence with a downlink transmission. The UE 430 may compare the number of NACKed CBs to a threshold number of NACKed CBs. If the number of NACKed CBs is higher than the threshold number of NACKed CBs, the UE 430 may generate a request signal for transmission to the BS 420. The threshold number of NACKed CBs may be selected by a user of the system, the BS 420 (e.g., via RRC and/or MAC-CE control signaling), the UE 430, or any other suitable user or component. The threshold number of NACKed CBs may also be a dynamic number dependent on the average or other statistical value or number of NACKed CBs transmitted from the UE over time, or dependent on other conditions. The threshold number of NACKed CBs may be modified by the UE 430, the BS 420, or other components or users. In some alternative embodiments, the UE 430 may compare a ratio value related to the NACKed CBs to a threshold, with the threshold being provided/selected according to some manner such as the examples given above. The ratio may be of NACKed CBs (or CBGs) to the total number of transmitted CBs (or CBGs), such as for the given transmission, or over a period of time, etc.

An observed condition of the UE 430 may also include an SINR value comparison. For example, the UE 430 may measure the SINR related to a downlink transmission 401 or over a predetermined period of time. The UE 430 may also store one or more threshold SINR values. If the measured SINR value falls below (or, in some situations, above) the threshold SINR value(s), the UE 430 may generate a request signal to be sent to the BS 420. The one or more threshold SINR values may be determined by any suitable means or may depend on any suitable variables, measurements, or metrics associated with the communication between the BS 420 and the UE 430. For example, a threshold SINR value may be determined relative to a nominal SINR value. A threshold SINR value may be a known SINR value measured previously by the UE 430 or another device. A threshold SINR value may be based on typical SINR values observed by similar devices in similar locations or of similar configurations. A threshold SINR value may also correspond to an SINR value required for decoding. A threshold SINR value may be determined by a user of the system, the BS 420 (e.g., via RRC and/or MAC-CE control signaling), the UE 430 or any other suitable user or component.

An observed condition of the UE 430 may also include a bit rate error (BER) measurement (or, alternatively, a BLER measurement—discussion below will be regarding BER for simplicity, but may be applicable to BLER as well). For example, the UE 430 may calculate a BER measurement associated with a downlink transmission 401. The measured BER value may be compared to a threshold BER value. This threshold BER value may be determined by a user of the system, the BS 420 (e.g., via RRC and/or MAC-CE control signaling), the UE 430, or any other suitable user or component. The threshold BER value may be determined relative to a nominal BER value, may be a known BER value measured previously by the UE 430 or another device, may be based on typical BER values observed by similar devices of similar configurations, or may be determined based any other suitable factors. The UE 430 may compare the measured BER value to the threshold BER value. If the measure BER value exceeds the threshold BER value, the UE 430 may generate a request signal to be sent to the BS 420.

If any of these described conditions are met as measured by the UE 430, the UE 430 may send a request signal to the BS 420 requesting that the BS 420 send a CSI resource signal. In some embodiments, one of the above conditions may be used, while in other embodiments multiple of them may be used in combination (e.g., as predefined by RRC and/or MAC-CE control signaling for either example). It is noted that these described conditions are not a comprehensive list and other decoding statuses or conditions may also trigger a request signal to be sent to the BS 420.

The request signal may be a part of a modified ACK/NACK field. Alternatively, the request signal may be sent as a separate field, may be appended to any other suitable field or sub-field, or otherwise transmitted to the BS 420. The request signal may be included as part of the physical uplink signal 406. The physical uplink signal 406 may be transmitted to the BS 420. As shown by the arrow from uplink signal 406 and the CSI resource 408, the CSI resource 408 may be based on the physical uplink signal 406. That is, upon receipt of the physical uplink signal 406, the BS 420 may process the received control signals and/or data as necessary, including a request signal for a CSI resource 408. In response to a request signal being included in the physical uplink signal 406, the BS 420 may generate a CSI reference signal for transmission to the UE 430.

The CSI reference signal may be the CSI resource 408 shown in FIG. 4. The CSI resource 408 may be referred to as a CSI reference signal, a reference signal, a downlink reference signal, a downlink resource signal, a resource signal, or any other suitable term. The CSI resource 408 may be of any suitable type. For example, in some embodiments, the CSI resource 408 may be a CSI-RS. Embodiments of the present disclosure are also applicable to any other suitable reference signal as the CSI resource 408, where the other reference signal may be used by a UE 430 for preparing and sending a CSI report for BS 420 to use. In some embodiments, the CSI resource 408 may include any or all of these signals. For example, the BS 420 have configured the UE 430 to enable CSI-RS triggering, or CSI-IM triggering, or both.

In some embodiments, the CSI resource 408 may be configured specific to the UE 430 which requested the CSI resource 408. In other embodiments, multiple UEs may share the same CSI resource 430. The CSI resource 408 may be configurable by the BS 420. The CSI resource 408 may be configured with any suitable number of ports. For example, in some applications, the CSI resource 408 may be configured with up to 32 ports (or more, depending on situation). The BS 420 may configure the CSI resource 408 to start at any suitable OFDM symbol of a slot. The CSI resource 408 may occupy any suitable number of OFUM symbols. For example, in some embodiments, the CSI resource 408 may occupy 1, 2, 4, or more OFDM symbols. The number of OFUM symbols occupied by the CSI resource 408 may be dependent on the configured number of ports. The number of symbols, number of ports, and/or other parameters may similarly be configured by RRC and/or MAC-CE control signaling (or DCI signaling).

Two time periods are shown in FIG. 4, specifically, time period 412 and time period 414. In some embodiments, the transmission of the request signal as part of the physical uplink signal 406 may be delayed by the first time period 412 from the time at which downlink transmission 401 was received. This time period 412 may be any suitable length of time. For example, the time period 412 may be measured in slots, symbols, milliseconds, or by any other suitable measurement. The time period 412 may be 1, 2, 3, or more symbols, or 1, 2, 3, or more slots in length. The length of the time period 412 may be determined by the BS 420 and specified via any suitable downlink control transmission (e.g., RRC, MAC-CE, DCI, etc.). The time period 412 may allow sufficient time for the UE 430 to process information (including ACK/NACK and/or analyzing one or more conditions of the signal(s) to determine if CSI should be requested) in the downlink transmission 401 and prepare any CSI request.

Time period 414 may be scheduled following the generation of the CSI resource 408 at the BS 420. For example, after the BS 420 has generated a CSI resource 408 (e.g., in response to triggering information of the physical uplink signal 406) and specified all necessary control signals for transmission to the UE 430, the BS may delay transmission of the CSI resource 408 by a time period corresponding to time period 414. The time period 414 may be similar in length to time period 412 or may differ therefrom. For example, the time period 414 may be any suitable length of time appropriate for the processing of the physical uplink signal 406, preparation of the CSI resource 408, etc. For example, the time period 414 may be measured in slots, symbols, milliseconds, or by any other suitable measurement and may be 1, 2, 3, or more symbols, or 1, 2, 3, or more slots in length. The length of the time period 414 may be determined by the BS 420 and specified via any suitable downlink control transmission such as RRC, MAC-CE, DCI, etc.

As shown by the arrow connecting the CSI resource 408 with the CSI report 410 in FIG. 4, the CSI resource 408 may transmitted to the UE 430. The CSI resource may be sent as a single downlink transmission or may be sent via multiple transmissions. For example, the CSI resource 408 may transmitted in bursts of two or four symbols which are spread across one or two slots. In other embodiments, the CSI resource 408 may be transmitted in bursts of additional symbols spread across additional slots.

The UE 430 may monitor for the CSI resource 408 according to the directions provided in the downlink control data specified by the BS 420 (e.g., RRC, MAC-CE, DCI or other control signaling). For example, the UE 430 may wait for the time period 414 as configured previously by the BS 420 (or other BS). Upon receiving the CSI resource 408, the UE 430 may use the CSI resource 408 to perform a number of measurements relating to the channel state. For example, the UE 430 may use the CSI resource 408 to perform reference signal receive power (RSRP) measurements during mobility and/or beam management. The UE 430 may also use the CSI resource 408 for frequency/time tracking, demodulation, UL reciprocity-based pre-coding, or any other processes, functions, measurements, or tests. The UE 430 may use the CSI resource 408 to measure one or more radio channel quality indicators or measurements to be used to generate a CSI report.

The CSI report 410 shown in FIG. 4 may be generated by the UE 430 after receiving the CSI resource 408 and completing measurements or tests in conjunction with the CSI resource 408. The CSI report 410 may include indicators (and/or the values of the parameter(s) themselves) relating to the quality of signal transmission between the BS 420 and the UE 430. For example, where the CSI resource 408 was a CSI-RS, the CSI report 410 may include one or more of a CQI, a rank indicator (RI), a precoding matrix indicator (PMI), a strongest layer indicator (SLI), an RSRP, or any other suitable indicator. As another example where the CSI resource 408 was a CSI-IM, the CSI report 410 may include one or more of an interference average power indicator, interference covariance matrix eigenvalues, an interference matrix rank, or any other suitable indicator or value. In some embodiments, the UE 430 may additionally compute a recommended precoder in conjunction with the CSI report 410. Further, where the BS 420 configured the UE 430 for both CSI-RS and CSI-IM triggering, the CSI report 410 may include some or all of the parameters noted above respectively for the CSI-RS and CSI-IM triggering.

In another embodiment of the disclosure, the UE 430 may transmit more than one request signal to the BS 420 before the CSI resource 408 is transmitted. For example, after receiving a downlink transmission from the BS 420, the UE 430 may evaluate the received data and determine to send a signal requesting a CSI resource 408 to the BS 420. This determination may be based on any one or more of the previously described conditions or other conditions or events. After a request signal is sent to the BS 420 via physical uplink signal 406, the BS 420 may not send a CSI resource 408 after the predetermined time period 412 until additional resource signals are sent by the UE 430 and received by the BS 420 to meet or exceed a predetermined threshold.

As an example for simplicity of discussion herein, the predetermined threshold of request signals to be received by the BS 420 may be three. The BS 420 may send a first physical downlink transmission to the UE 430. In response, the UE 430 may determine that a condition relating to the received data is met and may send a first request signal after time period 412 to the BS 420 requesting a CSI resource 408. The BS 420 may determine that the received request signals is one total within a time period, which does not meet or exceed the threshold number of received request signals of three. As a result, no CSI resource 408 is transmitted. The BS 420 may at some subsequent time transmit an additional physical downlink transmission to the UE 430. The UE 430 may again determine that a condition is met and may send a second request signal to the BS 420. The BS 420 may determine that the received request signals is two, which does not meet or exceed the threshold number of request signals of three. After receiving an additional physical downlink transmission at some later time, the UE 430 may send a third request signal to the BS 420. Upon receipt of the third request signal, the BS 420 may determine that the number of received request signals is three, which does meet the threshold of three.

Further, this threshold may be configured within a threshold time period, such that if the threshold is not met within the time period the count restarts. This threshold time period may be any suitable length of time and may be measured by any suitable units. For example, the time period may be measured in slots, symbols, or milliseconds and may be 1, 2, 3, or more slots, 1, 2, 3, or more symbols, or 1, 2, 3, or more milliseconds or any other suitable length or value of time. As a result of the number of requests meeting the threshold, and doing so within the appropriate time period, the BS 430 may proceed with transmitting CSI resource 408 to the UE 430 as shown in FIG. 4. The UE 430 may then generate a CSI report 410 and transmit the CSI report 410 to the BS 420.

Three requests was exemplary only. Any suitable number of request signals may be defined as the threshold number. For example, one, two, three, or more request signals may be defined as the threshold number. In some embodiments, the network, the BS 420, the UE 430, or any other component, or a user of the system or any other user may determine the threshold number of request signals. In addition, any of these components, devices, or users may also determine whether a CSI resource 408 will be transmitted to the UE 430 when a threshold is met or exceeded.

In some embodiments, an amount of data transmitted through a downlink share channel may be determined as an alternative to the time period just described. In such an embodiment, in order for the threshold of request signals to be met, the BS must receive at least the number of request signals equal to the threshold in response to a certain amount of data being received at the UE, at the BS, or both. As another alternative, the threshold number or request signals may be measured over discrete instances of downlink data transmission. For example, if the threshold number of request signals was sent and received in response to a certain number of preceding instances of downlink data transmission, the CSI resource 408 may be sent.

In an additional embodiment, no explicit request signal may be transmitted from the UE 430 to the BS 420. For example, in such an embodiment, the physical uplink signal 406 may not include a request signal requesting that the BS 420 transmit a CSI resource 408. Rather the physical uplink signal 406 may simply include a number of ACKs and/or NACKs, with the BS 420 tracking how many NACKs are transmitted within a given period of time. The BS 420 may be configured to transmit the CSI resource 408 after a number of NACKs meeting or exceeding a threshold number of NACKs is received by the BS 420.

For example, after receiving a downlink transmission from the BS 420, the UE may evaluate the received data and determine one or more ACKs or NACKs associated with the data. Although one or more NACKs may be sent to the BS 420, the BS 420 may not send a CSI resource 408 after the predetermined time period 412 if the number of NACKs does not exceed the threshold value. Rather, the BS 420 may wait to send the CSI resource 408 until additional NACKs are sent by the UE 430 and received by the BS 420 to meet or exceed a predetermined threshold. In some embodiments, the UE 430 may transmit multiple NACKs to the BS 420 in response to a received downlink transmission. For example, in some instances, the UE 430 may send a number of NACKs meeting or exceeding the threshold number of received NACKs in response to only one received physical downlink transmission. In other instances, the number of received NACKs by the BS 420 may not exceed the threshold until many physical downlink transmissions have occurred. Any suitable number of NACKs may be defined as the threshold number. In some embodiments, the network, the BS 420, the UE 430, or any other component, or a user of the system or any other user may determine the threshold number of NACKs. In addition, any of these components, devices, or users may also determine whether a CSI resource 408 will be transmitted to the UE 430 when a threshold is met or exceeded.

A time period may be determined in conjunction with the threshold number of NACKs. For example, upon a single instance of transmission of one or more NACKs from the UE 430 to the BS 420, the BS 420 and/or UE 430 may ascertain the number of NACKs transmitted only during a predetermined time period immediately preceding the most recent transmission of a NACK. This threshold time period may be any suitable length of time and may be measured by any suitable units. For example, the time period may be measured in slots, symbols, or milliseconds and may be 1, 2, 3, or more slots, 1, 2, 3, or more symbols, or 1, 2, 3, or more milliseconds or any other suitable length or value of time. Alternatively, an amount of data transmitted through a downlink share channel may be determined as an alternative to the time period. The threshold number of NACKs may also be monitored over a number of instances of downlink data transmission as previously described.

By configuring the BS 420 to transmit a CSI resource 408 in response to the number of received NACKs exceeding a threshold, no request signal explicitly requesting a CSI resource 408 may be needed from the UE 430. Rather, both the BS 420 and UE 430 may be configured with the threshold number of NACKs and respectively track the number as NACKs are sent. In this way, the BS 420 sends the CSI resource 408 to the UE 430 after the threshold is met or exceeded without a request signal from the UE 430 (and after time period 414). On the other end, the UE 430 monitors for a CSI resource 408 after the threshold is met or exceeded without sending a request signal (and after time period 414). In some embodiments, methods involving the transmission of the CSI resource 408 without an explicit request signal from the UE 430 to the BS 420 may be referred to as soft triggering methods.

Figure 5:
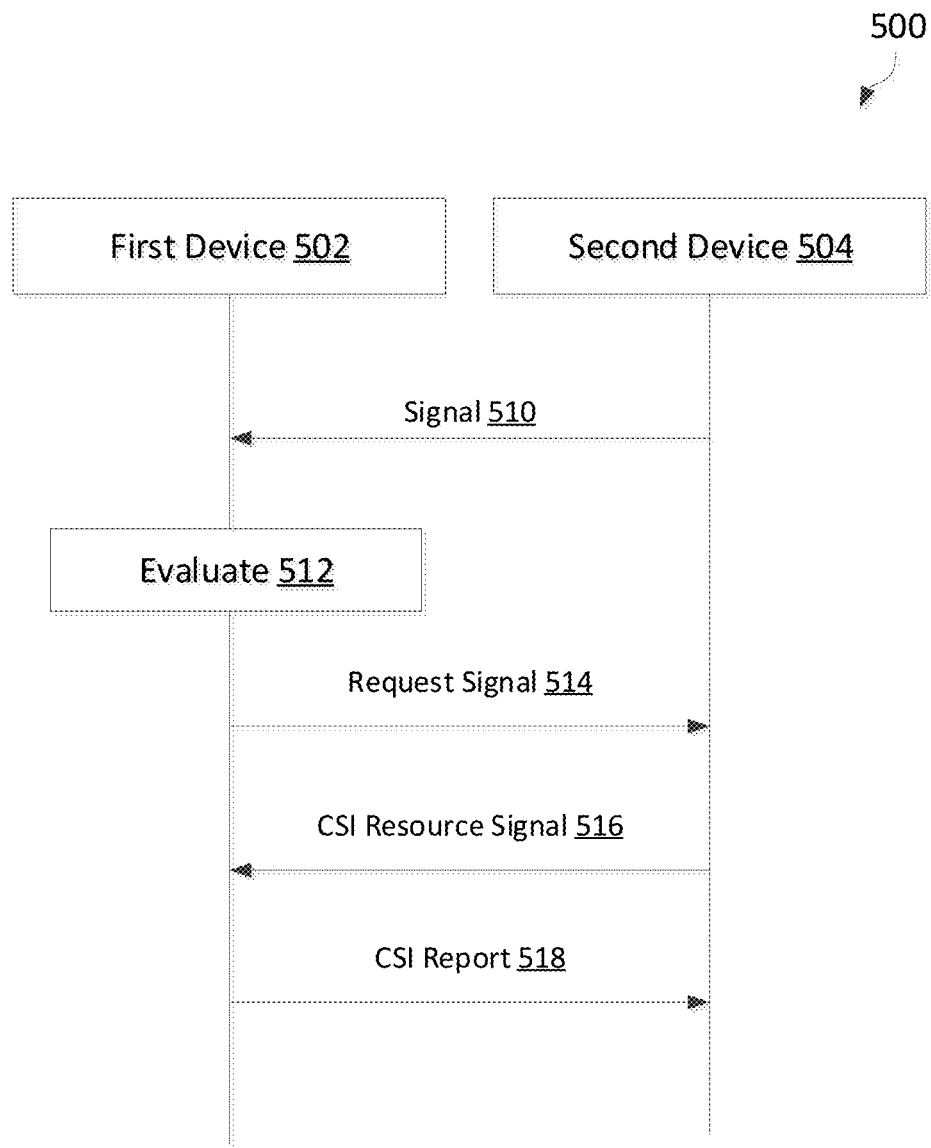
FIG. 5 illustrates an exemplary communication protocol diagram according to aspects of the present disclosure.

FIG. 5 illustrates an exemplary communication protocol diagram 500 according to aspects of the present disclosure. First device 502 may be a UE such as a UE 115, UE 200, or UE 430. Second device 504 may be a BS such as a BS 105, BS 300, or BS 420. Components of UE 200 discussed with respect to FIG. 2 may be utilized to perform the functions of communication protocol diagram 500. Likewise, components of BS 300 discussed with respect to FIG. 3 may be utilized to perform the functions of communication protocol diagram 500. Features of communication protocol diagram 500 may use structures such as those in FIGS. 2-4, and/or methods described in FIGS. 8 and 9.

At action 510, the second device 504 may transmit a signal to the first device 502. This signal transmission may correspond to a physical downlink transmission. The signal may include control data on PDCCH, for example. The control data may specify times or frequency bandwidths or perform any of the previously mentioned functions. The signal may also include data on PDSCH or any other suitable downlink channel. The second device 504 may transmit control signals, broadcast signals, paging signals, and/or data to the first device 502 via downlink channels at action 510. Action 510 may also include multiple instances of downlink transmission or may include only one instance of downlink transmission.

At action 512, the first device 502 may evaluate and/or otherwise process the data received in the downlink signal at action 510 (e.g., PDCCH and/or PDSCH). Evaluating the received data may include any of the previously mentioned measurements for one or more of the conditions related to decoding status according to embodiments of the present disclosure. For example, the first device 502 may determine one or more ACKs or NACKs associated with any suitable part of the received data. The first device 502 may determine a number of NACKed CBs (or CBGs). The first device 502 may alternatively or additionally determine one or more decoding statuses or other conditions associated with the received data. For example, the first device 502 may determine observed MCS, LLRs quality, observed SINR, BLER, or BER to name a few. As previously mentioned, any one or more of these measurements, values, or conditions may be compared to nominal or threshold measurements, values, or conditions by the first device 502. If one or more of these conditions mentioned are satisfied as determined by the first device 502, a trigger may be satisfied. When the trigger is satisfied, the first device 502 may generate a request signal for transmission to the second device 504 requesting that a CSI resource signal be sent to the first device 502.

At action 514, the request signal may be transmitted from the first device 502 to the second device 504. As described with reference to FIG. 4, the request signal may be an explicit request signal requesting that the second device 504 send a CSI reference signal to the first device. This request signal may be a subfield of a greater field within a physical uplink transmission. For example, an ACK/NACK field may be modified to include a subfield correlating to the request signal. For example, a one-bit subfield may be dedicated to the ACK/NACK value and an additional one-bit subfield in conjunction with the first subfield may be dedicated to the request signal (such as illustrated with the example of Table 1 above). While discussed with reference to a single bit for the ACK/NACK value, this may be expanded to include a bit for an ACI/NACK value for multiple components, such as CBs, CBGs, and/or component carriers or bandwidth parts, to name a few examples.

In this example, the first device 502 may send a modified ACK/NACK field to the second device 504 including a first subfield indicating an ACK and a second subfield indicating a request for a CSI reference signal. Alternatively, the first subfield may include an ACK but the second subfield may not indicate a request. Alternatively, the first subfield may include a NACK and the second subfield may indicate a request signal for a CSI reference signal or the first subfield may include a NACK and the second subfield may not indicate a request for a CSI reference signal. The request signal may also be transmitted from the first device 502 to the second device 504 as a separate field within the uplink transmission as the ACK/NACK field.

At action 516, the second device 504 may generate and transmit a CSI resource signal to the first device 502 (e.g., CSI-RS and/or CSI-IM). In some embodiments, the first device 502 may be in communication with additional devices similar to the second device 504. In some embodiments, the CSI resource signal may enable the first device 502 to estimate the CSI for multiple neighbor cells as well as the serving cell of the second device 504 to support multi-cell cooperative transmission schemes. The CSI resource signal may be spaced with uniform spacing in the frequency domain or not. In some embodiments, the second device 504 may minimize the number of subframes containing the CSI resource signal in the time domain. This may allow the first device 502 to estimate the CSI reference signal for different antenna ports and different cells with a minimal wake-up duty cycle. In some embodiments, the CSI resource signal sent from the second device 504 to the first device 502 may be specific to the first device 502. In other embodiments, the second device 504 may transmit the same CSI resource signal to multiple devices similar to the first device 502. The second device 504 may specify by RRC signaling (or MAC-CE) the duty cycle and offset of the subframes containing the CSI resource signal. The second device 504 may additionally specify a number of CSI resource signal ports, CSI resource signal configuration, subframe configurations, and/or any other parameters.

At action 518, the first device 502 may transmit a CSI report to the second device 504. As mentioned previously, the CSI report may correspond to the channel quality of communication between the first device 502 and the second device 504 as well as other channel properties. The CSI report may include any of the previously mentioned measurements, values, or metrics. For example, where the CSI resource is CSI-RS, the CSI report may include the CQI, observed MCS, RI, a precoding matrix indicator (PMI), a CSI-RS resource indicator (CRI), RSRP, SLI, and/or any other suitable indicators. In other examples where the CSI resource is CSI-IM, the CSI report may include an interference average power indicator, interference covariance matrix eigenvalues, and/or an interference matrix rank. Further, where the CSI resource includes CSI-RS and CSI-IM, the CSI report may include some combination of various metrics. Upon receipt of the CSI report by the second device 504 from the first device 502, the second device 504 may alter parameters related to the communication to improve signal quality. For example, the second device 504 may alter scheduling, selection of multiantenna schemes, rank and link adaptation, coherent demodulation, precoding, weighting in multiantenna transmission and reception, or any other parameters.

Figure 6:
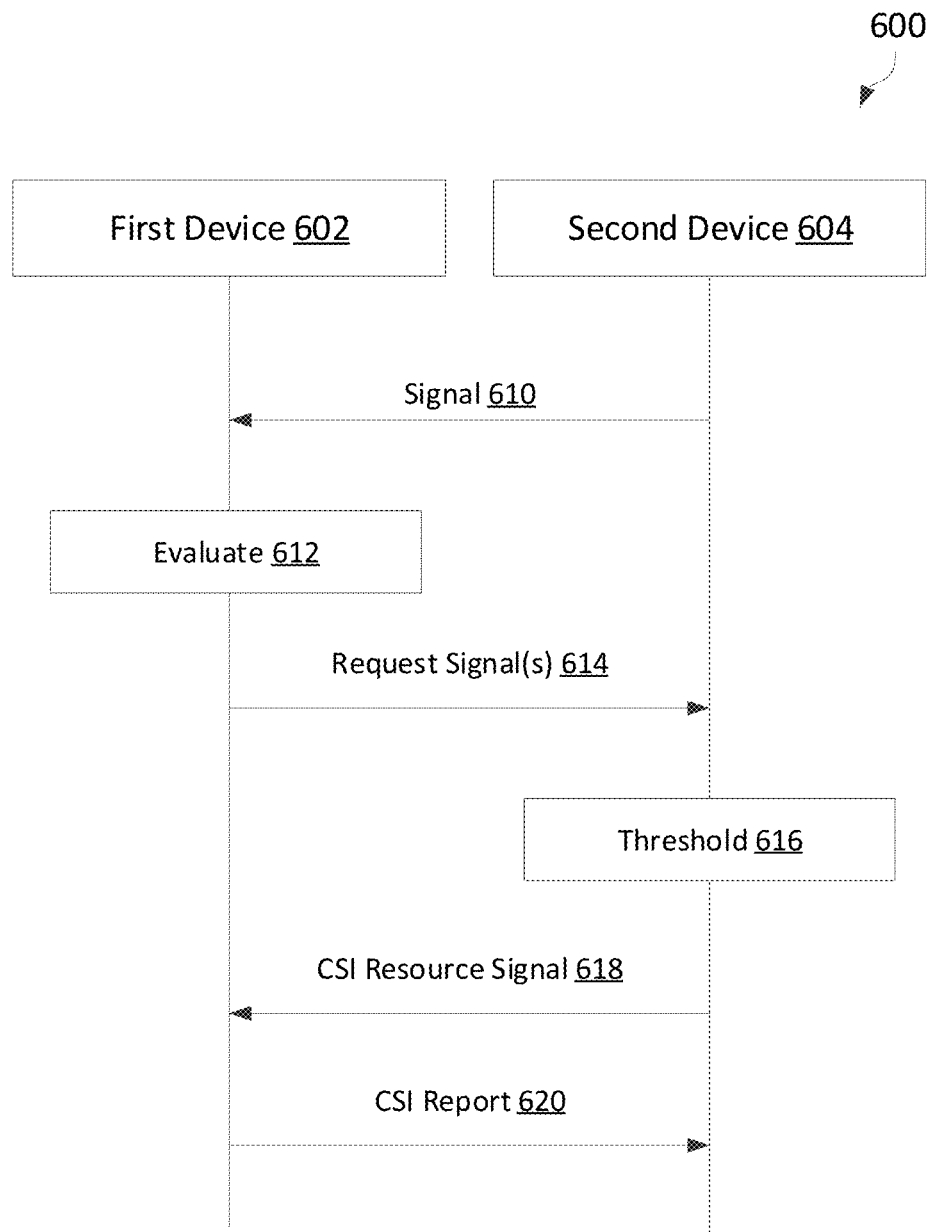
FIG. 6 illustrates an exemplary communication protocol diagram according to aspects of the present disclosure.

FIG. 6 illustrates an exemplary communication protocol diagram 600 according to aspects of the present disclosure. First device 602 may be a UE such as a UE 115, UE 200, or UE 430. Second device 604 may be a BS such as a BS 105, BS 300, or BS 430. Components of UE 200 discussed with respect to FIG. 2 may be utilized to perform the functions of communication protocol diagram 600. Likewise, components of BS 300 discussed with respect to FIG. 3 may be utilized to perform the functions of communication protocol diagram 600. Features of communication protocol diagram 600 may use structures such as those in FIGS. 2-4, and/or methods described in FIGS. 8 and 9.

At action 610, the second device 604 may transmit a signal to the first device 602. The action 610 may be substantially similar to the action 510 described with reference to FIG. 5.

At action 612, the first device 602 may evaluate the data received in the downlink signal at action 610. The action 612 may be substantially similar to the action 512 described with reference to FIG. 5 with respect to one or more decoding statuses or other conditions. If one or more of these conditions mentioned are satisfied as determined by the first device 602 from action 612, a trigger may be satisfied. When the trigger is satisfied, the first device 602 may generate a request signal for transmission to the second device 604 requesting that a CSI resource signal be sent to the first device 602.

At action 614, the request signal may be transmitted from the first device 602 to the second device 604. The action 614 may be substantially similar to the action 514 described with reference to FIG. 5 (e.g., using an explicit request signal), and may include adding the request signal as part of a modified ACK/NACK field.

At action 616, the second device 604 may determine the number of received request signals and compare the number of received request signals from the first device 602 to a threshold number of received request signals. In this way, the first device 602 may transmit more than one request signal to the second device 604 before the CSI resource signal is transmitted as shown in FIG. 6 at action 618. For example, after receiving a downlink transmission from the second device 604, the first device 602 may evaluate the received data and determine that a signal requesting a CSI resource signal is to be sent to the second device 604. After a request signal is sent to the second device 604, the second device 604 may not send the CSI resource signal until additional resource signals are sent by the first device to meet or exceed a predetermined threshold. A time period may also be determined in conjunction with the threshold number of request signals. For example, upon the transmission of a request signal from the first device 602 to the second device 604, the second device 604 and/or the first device 602 may ascertain the number of request signals transmitted during a predetermined time period (e.g., to determine whether the threshold number of request signals has been met within the predetermined time period). This threshold time period may be any suitable length of time and may be measured by any suitable units as discussed previously with reference to FIG. 4. If the threshold is not met within the predetermined time period, the process 600 may repeat starting with action 610 until the threshold is met within a subsequent time period.

At action 618, corresponding to when the threshold is met within the predetermined time period, the second device 604 may transmit a CSI resource signal to the first device 602. This transmission may occur after the second device 604 and/or the first device 602 determine that the number of request signals transmitted from the first device 602 to the second device 604 exceeds the threshold number within the time allotted as discussed at action 616. A time delay may also be applied between the time at which it is determined that the request signals received exceeds the threshold number of received request signals and the initiation of transmitting the CSI resource signal (or, alternatively, the time delay may correspond generally with a period of time used to process, analyze, etc. the ACK/NACKs and request signals from the first device 602). The CSI resource signal may be a CSI-RS. In other embodiments, the CSI resource signal may be a CSI-IM. Yet further, the CSI resource signal may include both CSI-RS and CSI-IM (e.g., distinct from each other). The CSI resource signal may be configured specific to the first device 602 or multiple devices similar to the first device 602 and in communication with the second device 604 may receive the same CSI resource signal. The CSI resource signal may be configurable by the second device 604.

At action 620, the first device 602 may transmit a CSI report to the second device 604 in response to receiving and processing the CSI resource signal at action 618. As mentioned previously, the CSI report may correspond to the channel quality of communication between the first device 602 and the second device 604 as well as other channel properties. The CSI report may include any of the previously mentioned measurements, values, or metrics, relating to CSI-RS, CSI-IM, or both. Upon receipt of the CSI report by the second device 604 from the first device 602, the second device 604 may alter parameters related to the communication to improve signal quality.

Figure 7:
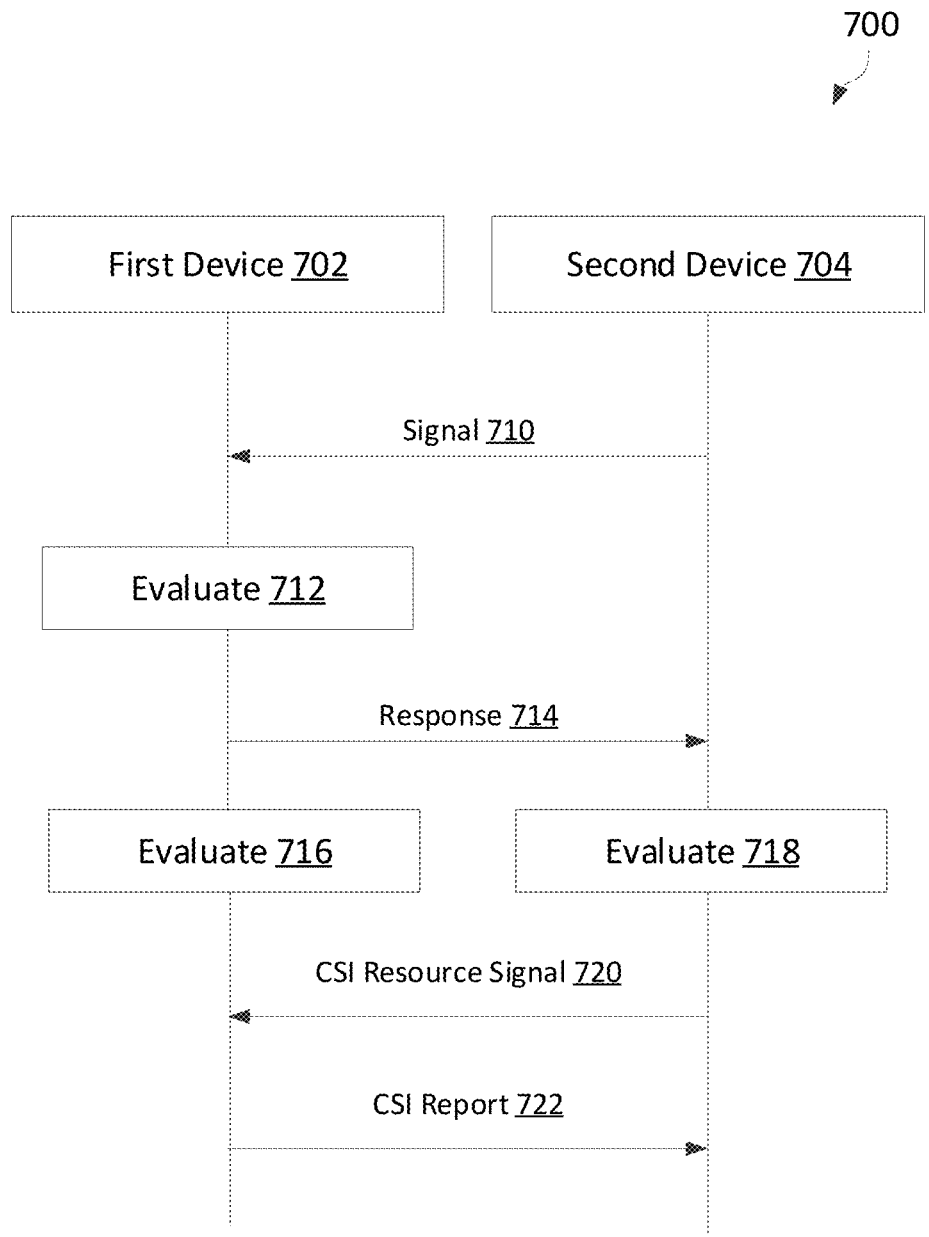
FIG. 7 illustrates an exemplary communication protocol diagram according to aspects of the present disclosure.

FIG. 7 illustrates an exemplary communication protocol diagram according to aspects of the present disclosure. First device 702 may be a UE such as a UE 115, UE 200, or UE 430. Second device 704 may be a BS such as a BS 105, BS 300, or BS 420. Components of UE 200 discussed with respect to FIG. 2 may be utilized to perform the functions of communication protocol diagram 700. Likewise, components of BS 300 discussed with respect to FIG. 3 may be utilized to perform the functions of communication protocol diagram 700. Features of communication protocol diagram 700 may use structures such as those in FIGS. 2-4, and/or methods described in FIGS. 8 and 9.

At action 710, the second device 704 may transmit a signal to the first device 702. The action 710 may be substantially similar to the action 510 described with reference to FIG. 5.

At action 712, the first device 702 may evaluate the data received in the downlink signal at action 710. Evaluating the received data may include any of the previously mentioned measurements described with reference to action 512 of FIG. 5 and/or action 612 of FIG. 6. Alternatively, action 712 may include just determining whether to ACK or NACK the signal received at action 710. For example, the first device 602 may determine one or more ACKs or NACKs associated with any suitable part of the received data, may determine a number of NACKed CBs, and/or CBGs. Instead of action 712 containing an action relating to transmitting an explicit request signal, the protocol described with reference FIG. 7 may illustrate a soft triggering method of communication.

At action 714, the first device 702 may transmit response data to the second device 704. In some embodiments, the first device 702 may transmit one or more ACK/NACK fields from the first device 702 to the second device 704 (e.g., with an unmodified ACK/NACK field as opposed to the modified fields discussed with respect to FIGS. 5 and 6, for example). In some embodiments, this data may be transmitted from the first device 702 to the second device 704 by a PUCCH, PUSCH, or other physical uplink channel.

At action 716, the first device 702 may determine the number of NACK values sent to the second device 704 and compare them to a threshold number of NACK values. The action 716 may share characteristics or features described with reference to FIG. 4. For example, a threshold number of NACKs transmitted by the first device 702 to the second device 704 may be predetermined and configured via RRC and/or MAC-CE signaling. The first device 702 may compare the number of sent NACKs to the second device 704 within a set amount of time (which may have also been configured via RRC, MAC-CE or other control signaling) to the predetermined threshold number of NACKs. If the number of NACKs sent exceeds the predetermined threshold within the amount of time, the first device may monitor for a CSI resource signal as will be described with reference to action 720. If, however, the number of sent NACKs does not exceed the threshold, or does not do so within the set amount of time, the first device 702 may not monitor for a CSI resource signal. Rather, the first device may continue to receive other downlink signals as described at action 710 and evaluate the signals to determine ACK/NACK values or other decoding statuses as described at action 712.

A time period may be determined in conjunction with the threshold number of NACKs. For example, upon a single instance of transmission of one or more NACKs from the first device 702 to the second device 704 as at action 714, the first device 702 may ascertain the number of NACKs transmitted during a predetermined time period. This threshold time period may be any suitable length of time and may be measured by any suitable units as previously described. In some alternative embodiments, the threshold number of NACKs may not correspond to a time period but may correspond to quantized transmissions. For example, a trigger may be configured such that is it only satisfied if the number of NACKs relating to a signal downlink transmission exceeds a threshold number. As another alternative, the threshold number of NACKs may be related proportionally to the amount of data transmitted in a single instance of downlink transmission. For example, the trigger may be satisfied if the number of NACKs exceeds a predetermined threshold after the transmission of a threshold amount of data as measured in kilobits (kB), megabits (mB), gigabits (gB), etc.

At action 718, the second device 704 may perform the same evaluation that the first device 702 performed at action 716. Specifically, the second device 704 may determine the number of NACK values sent to the second device 704 and compare them to a threshold number of sent NACK values, again within the set amount of time as discussed above with respect to action 716. The action 718 may be substantially similar to action 716. Action 718 may occur substantially simultaneously with action 716. Moreover, both first device 702 and second device 704 may determine either that the threshold number of NACKs has been exceeded or not.

At action 720, a CSI resource signal may be transmitted from the second device 704 to the first device 702 in response to the second device 704 concluding that the threshold number of NACKs has been exceeded within the set amount of time as discussed at action 718. The first device 702 may know to look for the CSI resource signal at the appropriate time based on the first 702 likewise concluding from action 716 that the threshold has been met within the set amount of time. A time delay may also be applied between the time at which it is determined that the request signals received exceeds the threshold number of received request signals and the initiation of transmitting the CSI resource signal, either as a result of processing delay and/or a wait delay. The resource signal and/or the transmission of the resource signal at action 720 may share characteristics or features as previously described with reference to the CSI resource 408 of FIG. 4, the action 516 of FIG. 5, the action 618 of FIG. 6, or any other suitable description herein.

At action 722, the first device 702 may transmit a CSI report to the second device 704 in response to receiving and processing the CSI resource signal at action 720. As mentioned previously, the CSI report may correspond to the channel quality of communication between the first device 702 and the second device 704 as well as other channel properties. The CSI report may include any of the previously mentioned measurements, values, or metrics, relating to CSI-RS, CSI-IM, or both. Upon receipt of the CSI report by the second device 704 from the first device 702, the second device 704 may alter parameters related to the communication to improve signal quality.

One or more of the protocols described in FIGS. 5-7 may be implemented simultaneously within the same network or communication relationship between a BS and UE. In other embodiments, only one or part of a protocol described may be implemented. In some embodiments, all protocols may be used.

Figure 8:
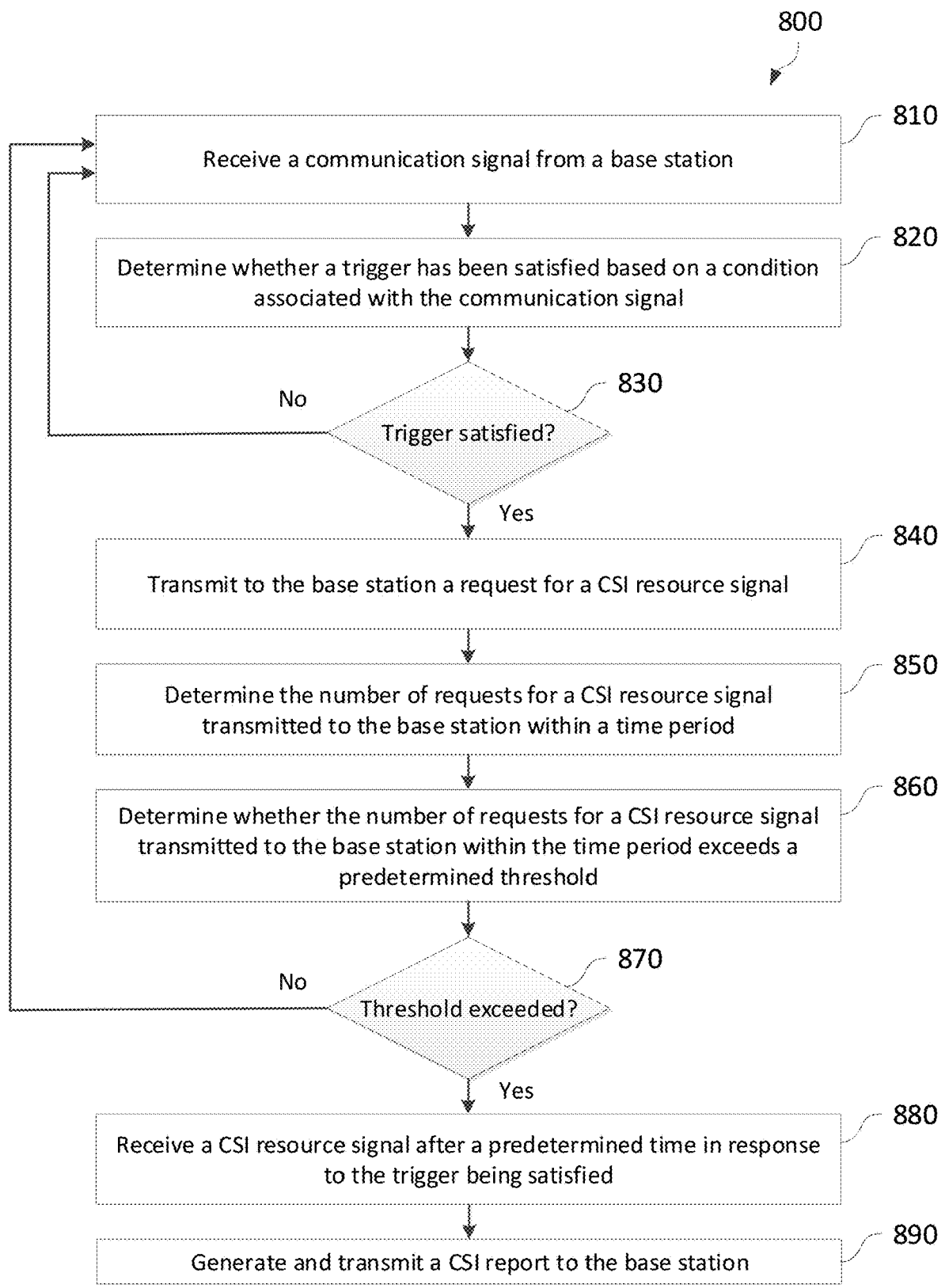
FIG. 8 illustrates a flow diagram of a method of wireless communications according to aspects of the present disclosure.

FIG. 8 illustrates a flow diagram 800 of a method for wireless communication according to some aspects of the present disclosure. The method 800 may be performed by a UE such as a UE 115, UE 200, or UE 430. Aspects of method 800 may utilize one or more components, such as the processor 202, the memory 204, the CSI module 208, the transceiver 210, the modem 212, and the one or more antennas 216, to execute the steps of method 800. As illustrated, the method 800 includes a number of enumerated steps, but aspects of the method 800 may include additional steps before, after, and in between the enumerated steps. In some aspects, one or more of the enumerated steps may be omitted or performed in a different order.

At block 810, the UE 200 may receive a communication signal from a base station (e.g., BS 300) through a downlink physical channel (such as of a 5G radio access network or other RAN type). Block 810 may include multiple instances of downlink transmission or may include one instance of downlink transmission.

At block 820, the UE 200 may determine whether a trigger has been satisfied based on a condition associated with the communication signal. The UE 200 may be configured to monitor whether a trigger has been satisfied at various times or steps throughout a communication transmission. For example, after a receiving a downlink transmission, the UE 200 may monitor one of many different conditions related to the quality or integrity of the data received and/or the quality of the communication signal or relationship between the UE 200 and BS 300 more generally. Evaluating the received data may include any of the measurements previously mentioned with reference to FIG. 4, action 512 of FIG. 5, action 612 of FIG. 6, or action 712 of FIG. 7. For example, the UE 200 may determine one or more ACKs or NACKs associated with any suitable part of the received data, a number of NACKed CBs, determine one or more decoding statuses or other conditions associated with the received data. Any one or more of these conditions, including meeting, exceeding, or falling below a predetermined threshold may cause the trigger to be satisfied.

At decision block 830, if the UE 200 determines from block 820 that the one or more triggers were not satisfied, then the method 800 returns to block 810 in which the UE 200 may again proceed with subsequent reception of signals to follow method 800 as described above and further below.

If, instead, at decision block 830 the UE 200 determines from block 820 that the one or more triggers was satisfied, then the method 800 proceeds to block 840.

At block 840, the UE 200 may transmit, in response to determining that the trigger was satisfied at decision block 830, to the stations 300 a request for a CSI resource signal. In some examples, the trigger may be one or more conditions/decoding status of the communication signal received at block 810. Corresponding to these examples, the request signal may be part of a modified ACK/NACK field (e.g., the request signal triggering the BS 300 to send a CSI resource signal such as described with respect to FIG. 5, or adding to a count above which may trigger the BS 300 to send a CSI resource signal such as described with respect to FIG. 6). In some other examples, the trigger may be a soft triggering method, in which case the request may be in the form of a number of NACKs sent and tracked by the BS 300 and the UE 200.

At block 850, the UE 200 may determine the number of requests for a CSI resource signal transmitted to the base station within a time period. This may correspond to embodiments related to FIG. 6, meaning that the BS 300 might not send a CSI resource signal (e.g., CSI-RS or CSI-IM) until a threshold number of requests are transmitted within a predetermined time frame. In embodiments where each request triggers a CSI resource signal, or where soft triggering is used, block 850 may be optional.

At block 860, the UE 200 may determine whether the number of requests for a CSI resource signal transmitted to the base station within the time period exceeds a predetermined threshold. In embodiments similar to that described with respect to FIG. 6 (waiting for a threshold number of requests for CSI resources), this may occur after block 850. In embodiments similar to that described with respect to FIG. 7 (soft triggering), the requests for CSI resource signals may instead refer to simply the number of NACKs (not requests) transmitted within a time frame. In embodiments similar to that described with respect to FIG. 5 (where each request may trigger a CSI resource signal), block 860 may be optional.

If the UE determines that the number of request signals transmitted to the BS over the immediately preceding predetermined time period exceeds the threshold number of transmitted request signals, the method 800 proceeds to block 880 as will be discussed. It is noted that while the UE may perform the determination of whether the number of request signals have exceeded a threshold number, the BS may additionally perform this determination simultaneously with the UE, before the UE, or after the UE. In other embodiments, only the BS may perform this determination and the UE may not make this determination. Different configurations relating to which components or devices perform which operations or blocks of method 800 may increase overall speed or efficiency of the method or communications process.

At block 870, the UE 200 determines whether the number of request signals transmitted to the BS 300 within the time period exceeded the predetermined threshold. This may correspond to examples similar to FIG. 6's embodiment. For examples similar to FIG. 7's embodiment (soft triggering), the requests for CSI resource signals may instead refer to simply the number of NACKs tracked compared to a threshold within a time frame. If not exceeded, the method 800 may return to block 810 and proceed as described above and further below. Alternatively, if exceeded within the preceding time period, the method 800 may proceeds to the block 880. In examples similar to that described with respect to FIG. 5 (where each request may trigger a CSI resource signal), blocks 850, 860, and 870 may be optional such that method 800 may proceed from block 840 to block 880.

At block 880, the UE 200 may receive a CSI resource signal after a predetermined time in response to the trigger being satisfied (or, more generally, in response to a request or number of NACKs being met). The CSI resource signal may be similar to the CSI resource 408 shown in FIG. 4, or the resource signal described with reference to action 516 of FIG. 5, action 618 of FIG. 6, or action 720 of FIG. 7. For example, the CSI resource signal may be of any suitable type including a CSI-RS, CSI-IM, or other resource signal. In some embodiments, the transmission of the CSI resource signal may be delayed by an allotted time corresponding to one or more symbols, slots, or other units to allow the UE 200 to know when to prepare and listen for the CSI resource signal.

At block 890, the UE 200 may generate a CSI report and transmit the report to the BS 300. The CSI report may be substantially similar to the CSI report 410 of FIG. 4, or the report described with reference to action 518 of FIG. 5, action 620 of FIG. 6, or action 722 of FIG. 7. The CSI report may contain any number of elements, measurements, indicators, metrics, or other information as previously described.

Figure 9:
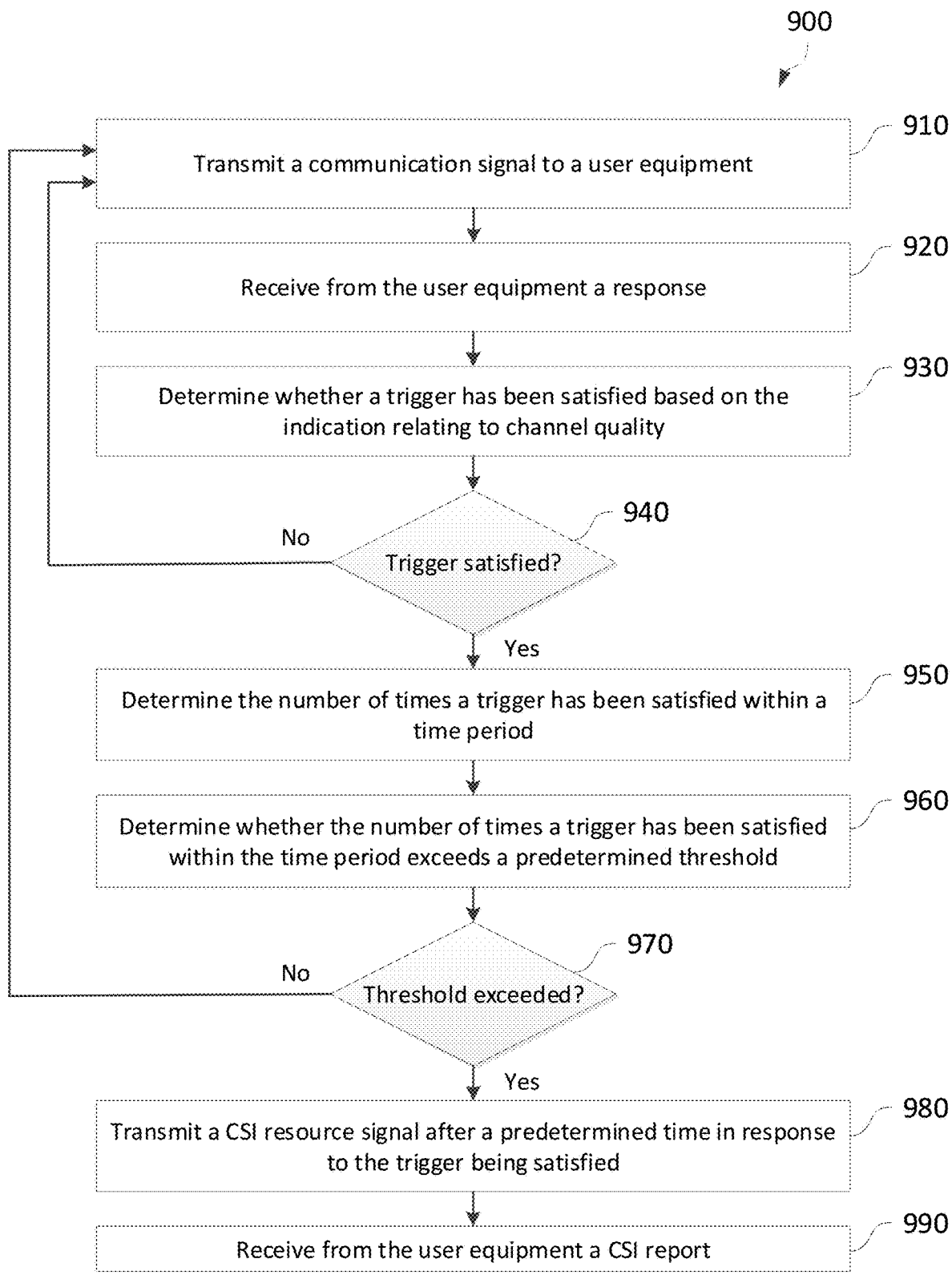
FIG. 9 illustrates a flow diagram of a method of wireless communications according to aspects of the present disclosure.

FIG. 9 illustrates a flow diagram 900 of a method for wireless communication according to some aspects of the present disclosure. The method described in flow diagram 900 may be performed by a BS such as a BS 105, BS 300, or BS 420. Aspects of method 900 may utilize one or more components, such as the processor 302, the memory 304, the CSI module 308, the transceiver 310, the modem 312, and the one or more antennas 316, to execute the steps of method 900. As illustrated, the method 900 includes a number of enumerated steps, but aspects of the method 900 may include additional steps before, after, and in between the enumerated steps. In some aspects, one or more of the enumerated steps may be omitted or performed in a different order.

At block 910, the BS 300 may transmit a communication signal to a UE 200. Block 910 may include multiple instances of downlink transmission or may include only one instance of downlink transmission.

At block 920, the BS 300 may receive from the UE 300 a response from the UE 200 related to the transmission at block 910. In some examples, the response may include one or more ACK/NACK fields from the UE 200. In some other examples, the response may be a request signal requesting that a CSI resource signal be generated and transmitted to the UE 200.

At block 930, the BS 300 may determine whether a trigger has been satisfied based on the response received at block 920. In some embodiments, a trigger may be determined to be satisfied if a number of received NACKs exceeds a predetermined threshold of received number of NACKs over a set time, amount of data, or number of instances of physical downlink transmission (e.g., corresponding to FIG. 7's soft triggering example). In other embodiments, a trigger may be satisfied if a request signal requesting a CSI resource signal is received from the UE (e.g., once as corresponding to FIG. 5's example, or a threshold number of times corresponding to FIG. 6's example).

At decision block 940, the BS 300 may determine whether the trigger was satisfied from block 930. In some examples, the trigger may refer to the number of NACKs sent within a window of time (e.g., corresponding to FIG. 7's example), or a number of request signals sent within a window of time (e.g., corresponding to FIG. 6's example). When aspects of FIG. 9 correspond to FIG. 5's example, the trigger may be met every time a request signal is received. If the BS 300 determines that the trigger has not been satisfied, then the method 900 may return to block 910 as discussed above and further below.

If, instead, at decision block 940 the BS 300 determines from block 930 that the trigger was satisfied, then the method 900 proceeds to block 950.

At block 950, the BS 300 may determine the number of times a trigger has been satisfied within a time period. In some embodiments of the disclosure, this may correspond to a number of NACKs within a time period (e.g., corresponding to FIG. 7's example). In other embodiments, this may corresponding to a number of request signals requesting a CSI resource signal within a time period (e.g., corresponding to FIG. 6's example). In embodiments where each request triggers a CSI resource signal, or where soft triggering is used, block 950 may be optional.

At block 960, the BS 300 may determine whether the number of times a trigger has been satisfied within the time period, instances of downlink transmission, or amount of data transmitted exceeds a predetermined threshold. In embodiments similar to that described with respect to FIG. 6 (waiting for a threshold number of requests for CSI resources), this may occur after block 950. In embodiments similar to that described with respect to FIG. 7 (soft triggering), the requests for CSI resource signals may instead refer to simply the number of NACKs (not requests) transmitted within a time frame. In embodiments similar to that described with respect to FIG. 5 (where each request may trigger a CSI resource signal), block 960 may be optional.

At decision block 970, the BS 300 may determine whether the number of request signals received by the BS 300 within a time period exceeds a predetermined threshold. This may correspond to examples similar to FIG. 6's embodiment. For examples similar to FIG. 7's embodiment (soft triggering), the requests for CSI resource signals may instead refer to simply the number of NACKs tracked compared to a threshold within a time frame. If not exceeded, the method 900 may return to block 910 and proceed as described above and further below. Alternatively, if exceeded within the time period, the method 900 may proceed to the block 980. In examples similar to that described with respect to FIG. 5 (each request triggers a CSI resource signal), blocks 940, 950, 960, and 970 may be optional such that method 900 may proceed from block 930 to block 980.

At block 980, the BS 300 may transmit a CSI resource signal after a predetermined time in response to the trigger being satisfied (or, more generally, in response to a request or number of NACKs being met). The CSI resource signal may be similar to the CSI resource 408 shown in FIG. 4, or the resource signal described with reference to action 516 of FIG. 5, action 618 of FIG. 6, or action 720 of FIG. 7. For example, the CSI resource signal may be of any suitable type including a CSI-RS, CSI-IM, or other resource signal. In some embodiments, the transmission of the CSI resource signal may be delayed by an allotted time corresponding to one or more symbols, slots, or other units.

At block 990, the BS 300 may receive from the UE 200 a CSI report. The CSI report may be substantially similar to the CSI report 410 of FIG. 4, or the report described with reference to action 518 of FIG. 5, action 620 of FIG. 6, or action 722 of FIG. 7. The CSI report may contain any number of elements, measurements, indicators, metrics, or other information as previously described.

The present disclosure also includes the following aspects:

Aspect 1. A method of wireless communication, comprising:
receiving, by a first wireless communications device, a signal from a second wireless communications device;
determining, by the first wireless communications device based on a condition associated with the signal, that a trigger has been satisfied; and
monitoring, by the first wireless communications device after a predetermined time in response to the trigger being satisfied, for a channel state information (CSI) resource signal from the second wireless communications device.

Aspect 2. The method of aspect 1, further comprising:
transmitting, by the first wireless communications device, a request signal to the second wireless communications device requesting the CSI resource signal in response to the trigger being satisfied.

Aspect 3. The method of aspect 2, further comprising:
including, by the first wireless communications device, the request signal with a modified acknowledgement/negative acknowledgement (ACK/NACK) field.

Aspect 4. The method of aspect 3, wherein the modified ACK/NACK field comprises a first sub-field for an ACK/NACK signal, and a second sub-field for the request signal.

Aspect 5. The method of any of aspects 3-4, further comprising:
receiving, by the first wireless communications device, a control signal that:
enables the modified ACK/NACK field;
configures resources for the CSI resource signal;
configures resources for the request signal; and
configures the predetermined time,
wherein the control signal comprises at least one of a radio resource control (RRC) signal, a medium access control (MAC) control element (CE) signal, or a downlink control information (DCI) signal.

Aspect 6. The method of any of aspects 2-5, wherein the condition comprises a decoding status.

Aspect 7. The method of any of aspects 2-6, further comprising:
tracking, by the first wireless communications device, a number of request signals transmitted by the first wireless communications device within a subset of time;
comparing, by the first wireless communications device, the number of request signals to a threshold number of request signals; and
monitoring, by the first wireless communications device, for the CSI resource signal in response to the number of request signals exceeding the threshold number of request signals.

Aspect 8. The method of any of aspects 1-7, further comprising:
transmitting, by the first wireless communications device to the second wireless communications device, a CSI resource report based on the CSI resource signal.

Aspect 9. A method of wireless communication, comprising:
transmitting, by a first wireless communications device, a signal to a second wireless communications device;
receiving, by the first wireless communications device from the second wireless communications device, a response message based on the signal;
determining, by the first wireless communications device, whether a trigger has been satisfied based on the response message; and
transmitting, by the first wireless communications device after a predetermined time in response to the trigger being satisfied, a channel state information (CSI) resource signal to the second wireless communications device.

Aspect 10. The method of aspect 9, wherein the response message comprises a request signal.

Aspect 11. The method of aspect 10, further comprising:
accessing, by the first wireless communications device, the request signal from a modified acknowledgement/negative acknowledgement (ACK/NACK) field.

Aspect 12. The method of aspect 11, wherein the modified ACK/NACK field comprises a first sub-field for an ACK/NACK signal, and a second sub-field for the request signal.

Aspect 13. The method of any of aspects 10-12, wherein the response message is received in response to a decoding status condition.

Aspect 14. The method of any of aspects 10-13, further comprising:
tracking, by the first wireless communications device, a number of request signals received from the second wireless communications device within a subset of time;
comparing, by the first wireless communications device, the number of request signals to a threshold number of request signals; and
determining, by the first wireless communications device, to transmit the CSI resource signal in response to the number of request signals exceeding the threshold number of request signals.

Aspect 15. The method of any of aspects 9-14, further comprising:
receiving, by the first wireless communications device from the second wireless communications device, a CSI resource report based on the CSI resource signal.

Aspect 16. A first wireless communications device, comprising:
a transceiver configured to receive a signal from a second wireless communications device; and
a processor configured to:
determine, based on a condition associated with the signal, that a trigger has been satisfied; and
monitor, after a predetermined time in response to the trigger being satisfied, for a channel state information (CSI) resource signal from the second wireless communications device.

Aspect 17. The first wireless communications device of aspect 16, wherein the transceiver is further configured to:
transmit a request signal to the second wireless communications device requesting the CSI resource signal in response to the trigger being satisfied.

Aspect 18. The first wireless communications device of aspect 17, wherein the processor is further configured to:
include the request signal with a modified acknowledgement/negative acknowledgement (ACK/NACK) field.

Aspect 19. The first wireless communications device of aspect 18, wherein the modified ACK/NACK field comprises a first sub-field for an ACK/NACK signal, and a second sub-field for the request signal.

Aspect 20. The first wireless communications device of any of aspects 18-19, wherein the transceiver is further configured to receive a control signal that:
enables the modified ACK/NACK field enables the modified ACK/NACK field;
configures resources for the CSI resource signal;
configures resources for the request signal; and
configures the predetermined time,
wherein the control signal comprises at least one of a radio resource control (RRC) signal, a medium access control (MAC) control element (CE) signal, or a downlink control information (DCI) signal.

Aspect 21. The first wireless communications device of any of aspects 17-20, wherein the condition comprises a decoding status.

Aspect 22. The first wireless communications device of any of aspects 17-21, wherein the processor is further configured to:
track a number of request signals transmitted by the first wireless communications device within a subset of time;
compare the number of request signals to a threshold number of request signals; and
monitor for the CSI resource signal in response to the number of request signals exceeding the threshold number of request signals.

Aspect 23. The first wireless communications device of any of aspects 16-22, wherein the transceiver is further configured to:
transmit, to the second wireless communications device, a CSI resource report based on the CSI resource signal.

Aspect 24. A first wireless communications device, comprising:
a transceiver configured to:
transmit a signal to a second wireless communications device; and
receive, by the first wireless communications device from the second wireless communications device, a response message based on the signal; and
a processor configured to determine whether a trigger has been satisfied based on the response message,
wherein the transceiver is further configured to transmit, after a predetermined time in response to the trigger being satisfied, a channel state information (CSI) resource signal to the second wireless communications device.

Aspect 25. The first wireless communications device of aspect 24, wherein the response message comprises a request signal.

Aspect 26. The first wireless communications device of aspect 25, wherein the processor is further configured to:
  access the request signal from a modified acknowledgement/negative acknowledgement (ACK/NACK) field.

Aspect 27. The first wireless communications device of aspect 26, wherein the modified ACK/NACK field comprises a first sub-field for an ACK/NACK signal, and a second sub-field for the request signal.

Aspect 28. The first wireless communications device of any of aspects 25-27, wherein the response message is received in response to a decoding status condition.

Aspect 29. The first wireless communications device of any of aspects 25-28, wherein the processor is further configured to:
  track a number of request signals received from the second wireless communications device within a subset of time;
  compare the number of request signals to a threshold number of request signals; and
  determine to transmit the CSI resource signal in response to the number of request signals exceeding the threshold number of request signals.

Aspect 30. The first wireless communications device of any of aspects 24-29, wherein the transceiver is further configured to:
  receive, from the second wireless communications device, a CSI resource report based on the CSI resource signal.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
  receiving, by a first wireless communications device, a signal from a second wireless communications device;
  determining, by the first wireless communications device based on a condition associated with the signal, that a trigger has been satisfied;
  transmitting, by the first wireless communications device in response to the trigger being satisfied, a request signal with a modified acknowledgement/negative acknowledgement (ACK/NACK) field to the second wireless communications device requesting a channel state information (CSI) resource signal; and
  monitoring, by the first wireless communications device after a predetermined time in response to the trigger being satisfied, for the CSI resource signal from the second wireless communications device.

2. The method of claim 1, wherein the modified ACK/NACK field comprises a first sub-field for an ACK/NACK signal, and a second sub-field for the request signal.

3. The method of claim 1, further comprising:
  receiving, by the first wireless communications device, a control signal that:
    enables the modified ACK/NACK field;
    configures resources for the CSI resource signal;
    configures resources for the request signal; and
    configures the predetermined time,
  wherein the control signal comprises at least one of a radio resource control (RRC) signal, a medium access control (MAC) control element (CE) signal, or a downlink control information (DCI) signal.

4. The method of claim 1, wherein the condition comprises a decoding status.

5. The method of claim 1, further comprising:
  tracking, by the first wireless communications device, a number of request signals transmitted by the first wireless communications device within a subset of time;
  comparing, by the first wireless communications device, the number of request signals to a threshold number of request signals; and
  monitoring, by the first wireless communications device, for the CSI resource signal in response to the number of request signals exceeding the threshold number of request signals.

6. The method of claim 1, further comprising:
  transmitting, by the first wireless communications device to the second wireless communications device, a CSI resource report based on the CSI resource signal.

7. A method of wireless communication, comprising:
  transmitting, by a first wireless communications device, a first signal to a second wireless communications device;
  receiving, by the first wireless communications device from the second wireless communications device, a response message based on the first signal, the response message comprising a request signal requesting a channel state information (CSI) resource signal;
  accessing, by the first wireless communications device, the request signal from a modified acknowledgement/negative acknowledgement (ACK/NACK) field;

determining, by the first wireless communications device, whether a trigger has been satisfied based on the response message comprising the request signal; and transmitting, by the first wireless communications device after a predetermined time in response to the trigger being satisfied, the CSI resource signal to the second wireless communications device.

8. The method of claim 7, wherein the modified ACK/NACK field comprises a first sub-field for an ACK/NACK signal, and a second sub-field for the request signal.

9. The method of claim 7, wherein the response message is received in response to a decoding status condition.

10. The method of claim 7, further comprising:
tracking, by the first wireless communications device, a number of request signals received from the second wireless communications device within a subset of time;
comparing, by the first wireless communications device, the number of request signals to a threshold number of request signals; and
determining, by the first wireless communications device, to transmit the CSI resource signal in response to the number of request signals exceeding the threshold number of request signals.

11. The method of claim 7, further comprising:
receiving, by the first wireless communications device from the second wireless communications device, a CSI resource report based on the CSI resource signal.

12. A first wireless communications device, comprising:
a transceiver configured to receive a first signal from a second wireless communications device; and
one or more processors configured to:
determine, based on a condition associated with the first signal, that a trigger has been satisfied;
transmit, in response to the trigger being satisfied, a request signal with a modified acknowledgement/negative acknowledgement (ACK/NACK) field to the second wireless communications device requesting a channel state information (CSI) resource signal; and
monitor, after a predetermined time in response to the trigger being satisfied, for the CSI resource signal from the second wireless communications device.

13. The first wireless communications device of claim 12, wherein the modified ACK/NACK field comprises a first sub-field for an ACK/NACK signal, and a second sub-field for the request signal.

14. The first wireless communications device of claim 12, wherein the transceiver is further configured to receive a control signal that:
enables the modified ACK/NACK field enables the modified ACK/NACK field;
configures resources for the CSI resource signal;
configures resources for the request signal; and
configures the predetermined time,
wherein the control signal comprises at least one of a radio resource control (RRC) signal, a medium access control (MAC) control element (CE) signal, or a downlink control information (DCI) signal.

15. The first wireless communications device of claim 12, wherein the condition comprises a decoding status.

16. The first wireless communications device of claim 12, wherein the one or more processors are further configured to:
track a number of request signals transmitted by the first wireless communications device within a subset of time;
compare the number of request signals to a threshold number of request signals; and
monitor for the CSI resource signal in response to the number of request signals exceeding the threshold number of request signals.

17. The first wireless communications device of claim 12, wherein the transceiver is further configured to:
transmit, to the second wireless communications device, a CSI resource report based on the CSI resource signal.

18. A first wireless communications device, comprising:
a transceiver configured to:
transmit a first signal to a second wireless communications device; and
receive, by the first wireless communications device from the second wireless communications device, a response message based on the first signal, the response message comprising a request signal requesting a channel state information (CSI) resource signal; and
one or more processors configured to:
access the request signal from a modified acknowledgement/negative acknowledgement (ACK/NACK) field; and
determine whether a trigger has been satisfied based on the response message comprising the request signal,
wherein the transceiver is further configured to transmit, after a predetermined time in response to the trigger being satisfied, the CSI resource signal to the second wireless communications device.

19. The first wireless communications device of claim 18, wherein the modified ACK/NACK field comprises a first sub-field for an ACK/NACK signal, and a second sub-field for the request signal.

20. The first wireless communications device of claim 18, wherein the response message is received in response to a decoding status condition.

21. The first wireless communications device of claim 18, wherein the one or more processors are further configured to:
track a number of request signals received from the second wireless communications device within a subset of time;
compare the number of request signals to a threshold number of request signals; and
determine to transmit the CSI resource signal in response to the number of request signals exceeding the threshold number of request signals.

22. The first wireless communications device of claim 18, wherein the transceiver is further configured to:
receive, from the second wireless communications device, a CSI resource report based on the CSI resource signal.

* * * * *